United States Patent
Kim et al.

(10) Patent No.: US 9,467,888 B2
(45) Date of Patent: Oct. 11, 2016

(54) METHOD FOR ESTIMATING CHANNEL STATE IN WIRELESS COMMUNICATION SYSTEM AND APPARATUS THEREFOR

(71) Applicant: LG ELECTRONICS INC., Seoul (KR)

(72) Inventors: Hyungtae Kim, Anyang-si (KR); Kijun Kim, Anyang-si (KR); Illsoo Sohn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 14/382,244

(22) PCT Filed: Apr. 22, 2013

(86) PCT No.: PCT/KR2013/003407
§ 371 (c)(1),
(2) Date: Aug. 29, 2014

(87) PCT Pub. No.: WO2013/162233
PCT Pub. Date: Oct. 31, 2013

(65) Prior Publication Data
US 2015/0055555 A1    Feb. 26, 2015

Related U.S. Application Data

(60) Provisional application No. 61/636,712, filed on Apr. 22, 2012, provisional application No. 61/641,862, filed on May 2, 2012.

(51) Int. Cl.
*H04W 24/10* (2009.01)
*H04W 24/08* (2009.01)
*H04L 25/02* (2006.01)

(52) U.S. Cl.
CPC ............. *H04W 24/10* (2013.01); *H04W 24/08* (2013.01); *H04L 25/02* (2013.01)

(58) Field of Classification Search
CPC ........... H04W 72/042; H04W 72/082; H04W 24/02; H04L 5/0048; H04L 1/0026; H04L 5/0073; H04B 7/0626
See application file for complete search history.

(56) References Cited

U.S. PATENT DOCUMENTS

| | | | |
|---|---|---|---|
| 8,750,152 B2 | 6/2014 | Koo et al. | |
| 2012/0202541 A1* | 8/2012 | Koo | H04L 1/20 455/501 |

(Continued)

FOREIGN PATENT DOCUMENTS

| | | |
|---|---|---|
| KR | 10-2011-0035807 A | 4/2011 |
| KR | 10-2011-0097623 A | 8/2011 |
| WO | WO 2011/046326 A2 | 4/2011 |

OTHER PUBLICATIONS

Alcatel-Lucent, "Comparison of CSI Feedback Schemes," 3GPP TSG-RAN WG1 #57bis, Agenda Item 15.2, R1-092310, Jun. 29-Jul. 3, 2009, Los Angeles, California, USA, 11 pages.

(Continued)

*Primary Examiner* — Jung Park
(74) *Attorney, Agent, or Firm* — Birch, Stewart, Kolasch & Birch, LLP

(57) ABSTRACT

The present invention relates to a wireless communication system. More specifically, the present invention relates to a method for reporting a channel state by a terminal to a serving base station in a wireless communication system, wherein extra channel state information is reported to enable the serving base station to estimate the channel state more accurately. When the base station estimates the channel state with the terminal, the channel state information received from the terminal, the extra channel state information, and traffic information of neighboring base stations are collectively considered to estimate the channel state with the terminal, thereby enabling estimation of the channel state with improved reliability and accuracy.

16 Claims, 18 Drawing Sheets

(56) References Cited

U.S. PATENT DOCUMENTS

| | | | |
|---|---|---|---|
| 2012/0315859 A1 | 12/2012 | Lee et al. | |
| 2013/0258965 A1* | 10/2013 | Geirhofer | H04W 72/048 370/329 |
| 2013/0265959 A1* | 10/2013 | Lee | H04W 72/0406 370/329 |
| 2014/0112406 A1* | 4/2014 | Zhu | H04B 7/0452 375/267 |

OTHER PUBLICATIONS

LG Electronics Inc., "Feedback Information for Downlink Coordinated Scheduling/Beamforming," 3GPP TSG RAN WG1 Meeting #57bis, Agenda Item 15.2, R1-092491, Jun. 29-Jul. 3, 2009, Los Angeles, California, USA, 4 pages.

* cited by examiner

FIG. 2
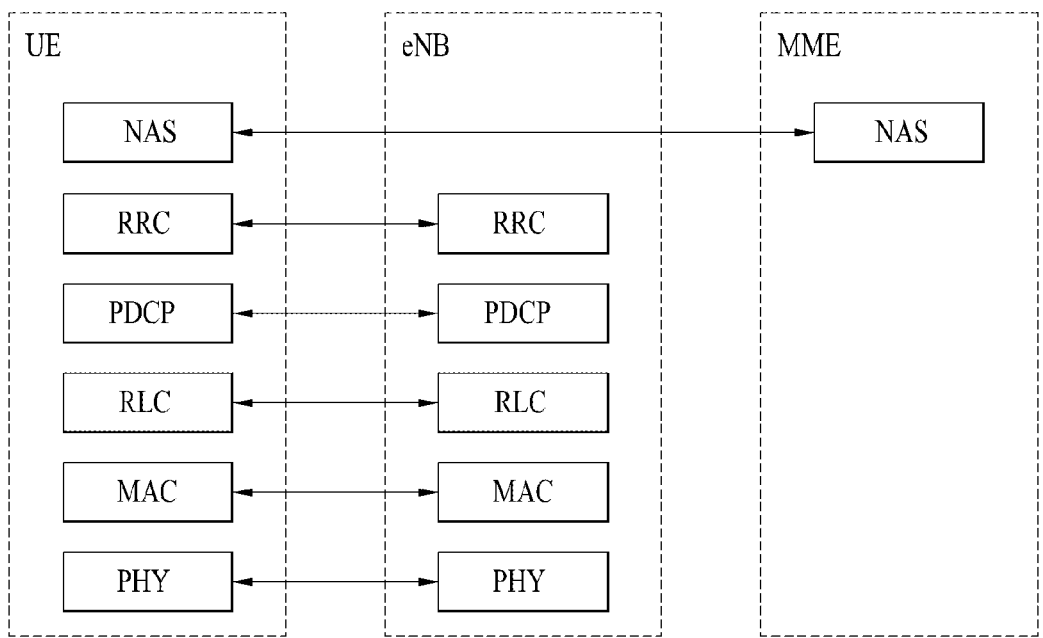
(a) control plane protocol stack
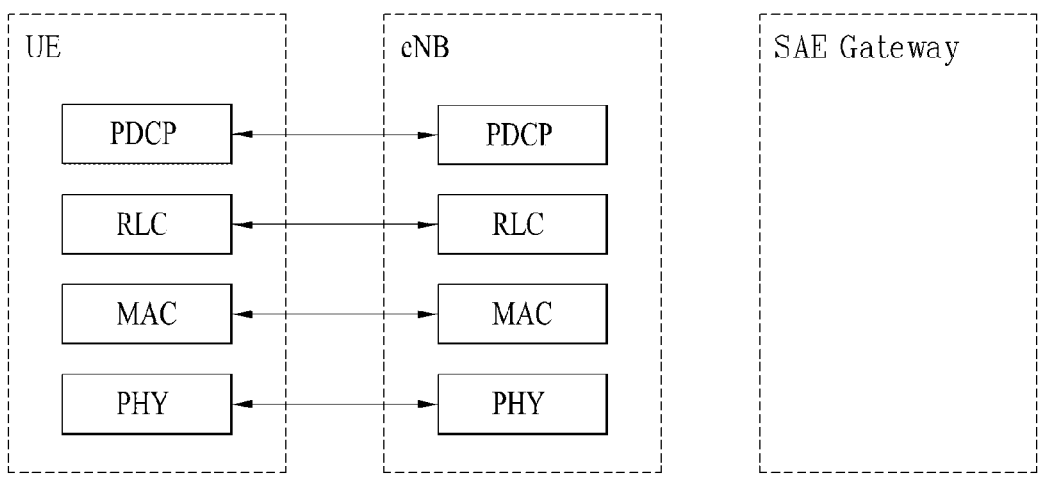
(b) user plane protocol stack Muting resources of point A Interference measurement REs for UE1
Interference measurement REs for UE2

Muting resources of point A

FIG. 11C
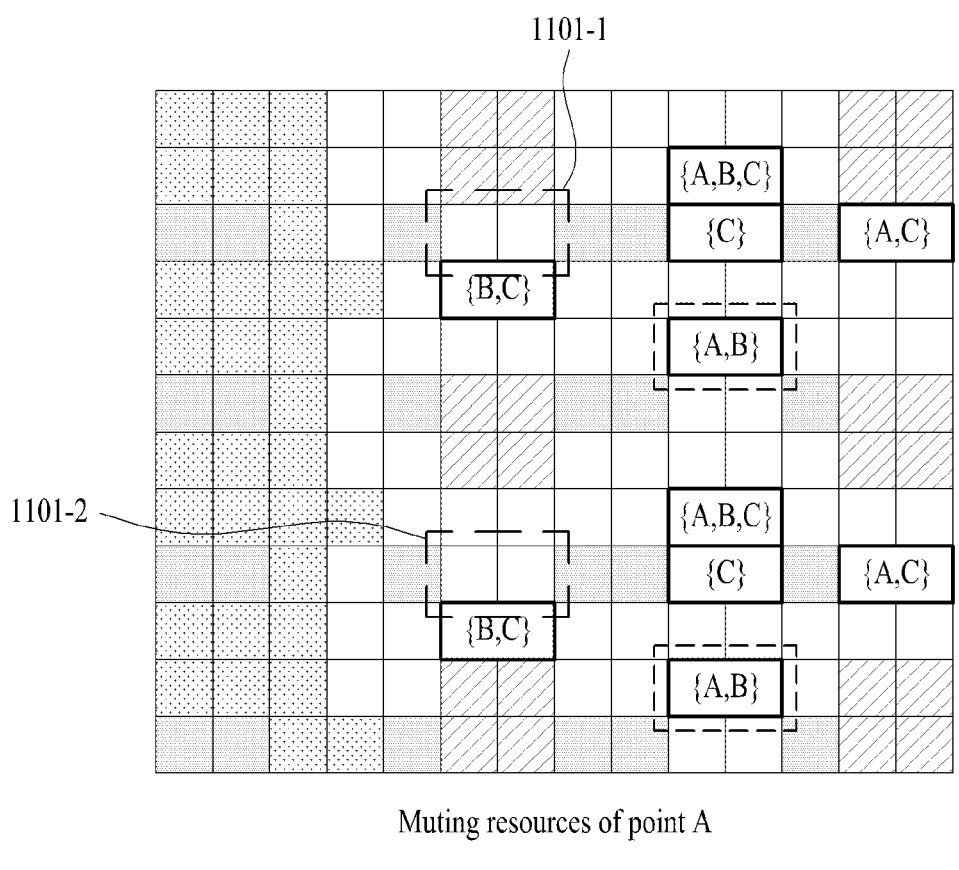
Muting resources of point A
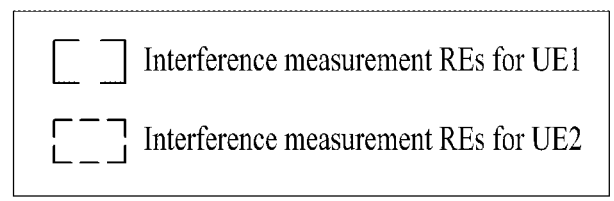

FIG. 12

Table comparing UE-specific interference measurement zone with cell-specific interference measurement zone

|  | UE-specific interference measurement zone | Cell-specific interference measurement zone |
|---|---|---|
| advantage | • Not need to separately correct result<br>• Applicable to various scenarios | • Resource use for muting is not big<br>• Similarly, applicable to various scenarios |
| disadvantage | • Resource overhead may occur for muting | • Need to separately correct result |

METHOD FOR ESTIMATING CHANNEL STATE IN WIRELESS COMMUNICATION SYSTEM AND APPARATUS THEREFOR

CROSS REFERENCE TO RELATED APPLICATIONS

This application is the National Phase of PCT International Application No. PCT/KR2013/003407, filed on Apr. 22, 2013, which claims priority under 35 U.S.C. 119(e) to U.S. Provisional Application Nos. 61/636,712, filed on Apr. 22, 2014 and 61/641,862 filed on May 2, 2012, all of which are hereby expressly incorporated by reference into the present application.

TECHNICAL FIELD

The present invention relates to a wireless communication system, and more particularly, to a method of measuring a channel state in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

In order to support efficient management of a wireless communication system of an eNode B, a user equipment periodically and/or aperiodically reports state information of a current channel to the eNode B. As mentioned in the foregoing description, the information on the channel state feedback by the user equipment is called channel state information (CSI). In calculating the channel state information, the user equipment should consider not only an interference signal of the eNode B with which a data is transceived but also an interference signal of a different eNode B. Hence, it is necessary to have a method of precisely measuring strength of the interference signal from the different eNode B.

In the meantime, channel state information received from a user equipment corresponds to channel state information to which traffic information of interference-causing different eNode B is not reflected. There may exist an error in the channel state information according to the extent of traffic of the different eNode Bs. Hence, it is necessary to have a method of more precisely correcting the channel state information in consideration of the extent of the traffic of the different eNode Bs.

DISCLOSURE OF THE INVENTION

Technical Task

Accordingly, the present invention intends to propose a method of measuring interference strength in a wireless communication system and apparatus therefor in the following description based on the discussion as mentioned in the foregoing description.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of reporting a channel state, which is reported by a user equipment to a serving eNode B in a wireless communication system, includes the steps of calculating a first channel state information based on a first interference strength corresponding to an interference strength from a first eNode B group and calculating a second channel state information based on an identification information of an eNode B belonging to a second eNode B group, wherein the second channel state information is used for correcting the first channel state information and wherein the serving eNode B estimates the channel state based on the corrected first channel state information.

In the aforementioned method, the second channel state information calculating step can include the steps of calculating a second interference strength corresponding to an interference strength received from the second eNode B group based on the identification information of the eNode B and calculating the second channel state information based on a ratio between the first and the second interference strength.

In the method according to the aforementioned embodiment, the second channel state information is determined by a Formula $$CSI_2 = \frac{\sum_{i=1}^{n} P_i}{I_m},$$

a $CSI_2$ corresponds to the second channel state information, i corresponds to an identification index of the eNode B belonging to the second eNode B group, the identification information of the eNode B includes the identification index of the eNode B, n indicates the number of eNode Bs belonging to the second eNode B group, and $I_m$ may correspond to the first interference strength.

And, in the method according to the aforementioned embodiment, the first interference strength measuring step can measure the first interference strength on an IMR (interference measurement resource) defined for the first eNode B group.

To further achieve these and other advantages and in accordance with the purpose of the present invention, according to a different embodiment, a method of estimating a channel state, which is estimated by an eNode B based on a channel state information received from a user equipment in a wireless communication system, includes the steps of receiving a first interference strength corresponding to an interference strength from a first eNode B group and a first channel state information indicating a channel strength ratio formed between the eNode B and the user equipment, transmitting an identification information of an eNode B belonging to a second eNode B group to the user equipment, receiving a second channel state information indicating a ratio between a second interference strength corresponding to an interference strength from the second eNode B group and the first interference strength and correcting the first channel state information based on the second channel state information.

In the method according to the aforementioned embodiment, the first channel state information correcting step corrects the first channel state information based on a first Formula $$CSI' = \frac{CSI_1}{1 + (\alpha_1 \beta_1 + \alpha_2 \beta_2 + \alpha_3 \beta_3 + , , , + \alpha_n \beta_n) CSI_2},$$

a $CSI'$ corresponds to the corrected first channel state information, $CSI_1$ corresponds to the first channel state information, i corresponds to an identification index of the eNode B belonging to the second eNode B, identification information of the eNode B includes the identification index of the eNode B, $a_i$ corresponds to a value indicating a traffic load of a eNode B corresponding to the eNode B of the identification index i (where $0 \le a_i \le 1$), and $B_i$ may correspond to a ratio between an interference strength received from the eNode B corresponding to the eNode B of the identification index i and the second interference strength.

In this case, the $B_i$ is defined by a second Formula $$\beta_i = \frac{RSRP_i}{\sum_{j=1}^{n} RSRP_j},$$

$RSRP_i$ in the second Formula can be calculated based on a reception power of a reference signal received from the eNode B corresponding to the eNode B of the identification index i.

A following item can be commonly applied to the aforementioned embodiments of the present invention.

The corrected first channel state information can be determined further based on traffic load information on the eNode B belonging to the second eNode B group.

To further achieve these and other advantages and in accordance with the purpose of the present invention, according to a different embodiment, a user equipment reporting a channel state to a serving eNode B in a wireless communication system includes a reception module configured to receive a downlink signal from an eNode B, a transmission module configured to transmit an uplink signal to the eNode B and a processor configured to access the reception module and the transmission module and configured to control an operation of the user equipment, the processor configured to calculate a first channel state information based on a first interference strength corresponding to an interference strength from a first eNode B group and the processor configured to calculate a second channel state information based on an identification information of an eNode B belonging to a second eNode B group, wherein the second channel state information is used for correcting the first channel state information and wherein the serving eNode B can estimate the channel state based on the corrected first channel state information.

In this case, the corrected first channel state information can be determined further based on traffic load information on the eNode B belonging to the second eNode B group.

And, in case of an operation of calculating the second channel state information, the processor can calculate a second interference strength corresponding to an interference strength received from the second eNode B group based on the identification information of the eNode B and the second channel state information based on a ratio between the first and the second interference strength.

Or, the second channel state information is determined by a Formula $$CSI_2 = \frac{\sum_{i=1}^{n} P_i}{I_m},$$

a $CSI_2$ corresponds to the second channel state information, i corresponds to an identification index of the eNode. B belonging to the second eNode B group, the identification information of the eNode B includes the identification index of the eNode B, n indicates the number of eNode Bs belonging to the second eNode B group, $I_m$ may indicate the first interference strength.

And, the processor can measure the first interference strength on an IMR (interference measurement resource) defined for the first eNode B group.

To further achieve these and other advantages and in accordance with the purpose of the present invention, according to a further different embodiment, an eNode B estimating a channel state based on a channel state information received from a user equipment in a wireless communication system includes a reception module configured to receive an uplink signal from a user equipment, a transmission module configured to transmit a downlink signal to the user equipment and a processor configured to access the reception module and the transmission module and configured to control an operation of the eNode B, the processor configured to receive a first interference strength corresponding to an interference strength from a first eNode B group and a first channel state information indicating a channel strength ratio formed between the eNode B and the user equipment, the processor configured to transmit an identification information of an eNode B belonging to a second eNode B group to the user equipment, the processor configured to receive a second channel state information indicating a ratio between a second interference strength corresponding to an interference strength from the second eNode B group and the first interference strength, the processor configured to correct the first channel state information based on the second channel state information.

In this case, the processor is configured to receive a traffic load information of the eNode B belonging to the second eNode B group via the reception module and correct the first channel state information in a manner of further considering the traffic load information of the eNode B belonging to the second eNode B group.

Or, the processor is configured to correct the first channel state information based on a first Formula $$CSI' = \frac{CSI_1}{1 + (\alpha_1\beta_1 + \alpha_2\beta_2 + \alpha_3\beta_3 + , , , +\alpha_n\beta_n)CSI_2},$$

a CSI' corresponds to the corrected first channel state information, CSI1 corresponds to the first channel state information, i corresponds to an identification index of the eNode B belonging to the second eNode B, identification information of the eNode B includes the identification index of the eNode B, ai corresponds to a value indicating a traffic load of a eNode B corresponding to the eNode B of the identification index i (where 0≤ai≤1), and Bi corresponds to a ratio between an interference strength received from the eNode B corresponding to the eNode B of the identification index i and the second interference strength.

And, the $B_i$ is defined by a second Formula $$\beta_i = \frac{RSRP_i}{\sum_{j=1}^{n} RSRP_j},$$

$RSRP_i$ in the second Formula can be calculated based on a reception power of a reference signal received from the eNode B corresponding to the eNode B of the identification index i.

It is to be understood that both the foregoing general description and the following detailed description are exemplary and explanatory and are intended to provide further explanation of the invention as claimed.

Advantageous Effects

According to embodiments of the present invention, it is able to precisely measure or correct strength of an interference signal received from not only a base station with which a data is transceived but also a different base station in a wireless communication system.

According to embodiments of the present invention, it is able to estimate a more accurate channel state in consideration of the extent of traffic of not only a base station with which a data is transceived but also a different base station in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of radio interface protocol between a 3GPP radio access network standard-based user equipment and E-UTRAN;

FIG. 12 is a table summarizing pros and cons for a scheme of a UE-specific interference measurement zone and a scheme of a cell-specific interference measurement zone;

BEST MODE

Mode for Invention

Figure 1:
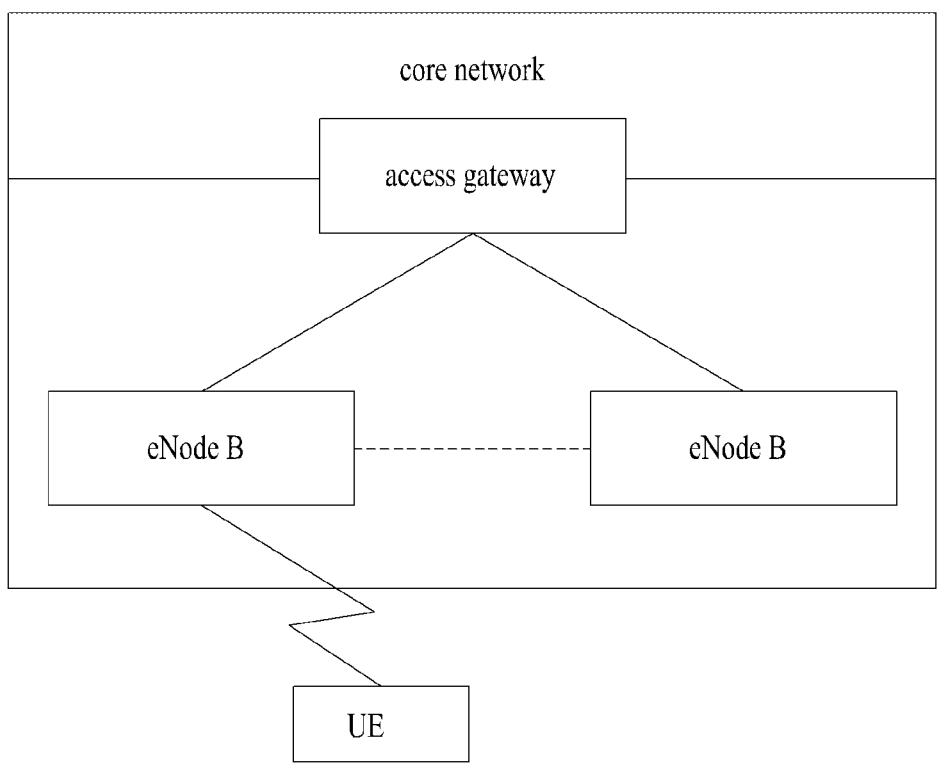
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention can be applied to H-FDD or TDD in a manner of being easily modified.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHZ, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
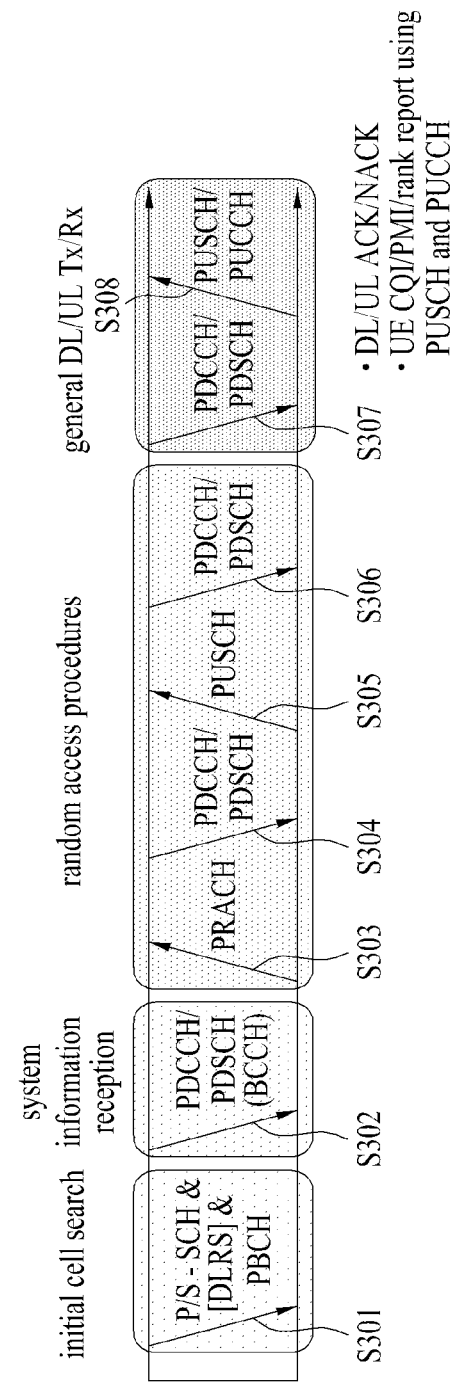
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
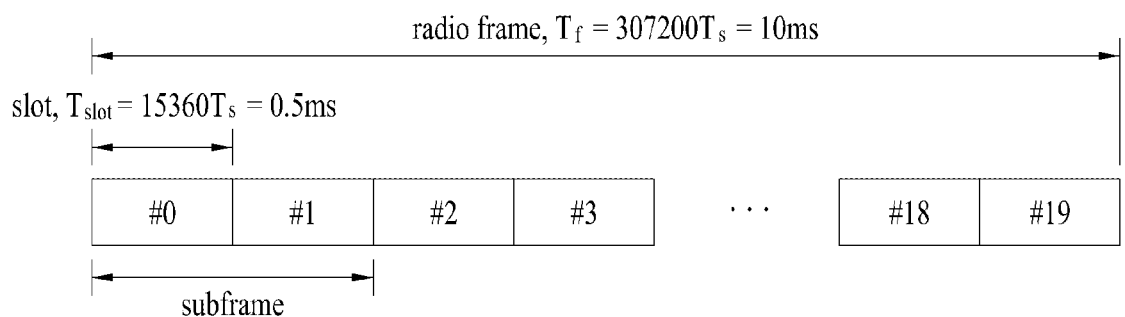
FIG. 4 is a diagram for a structure of a radio frame in LTE system.

FIG. 4 is a diagram for a structure of a radio frame used in an LTE system.

Referring to FIG. 4, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers ×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
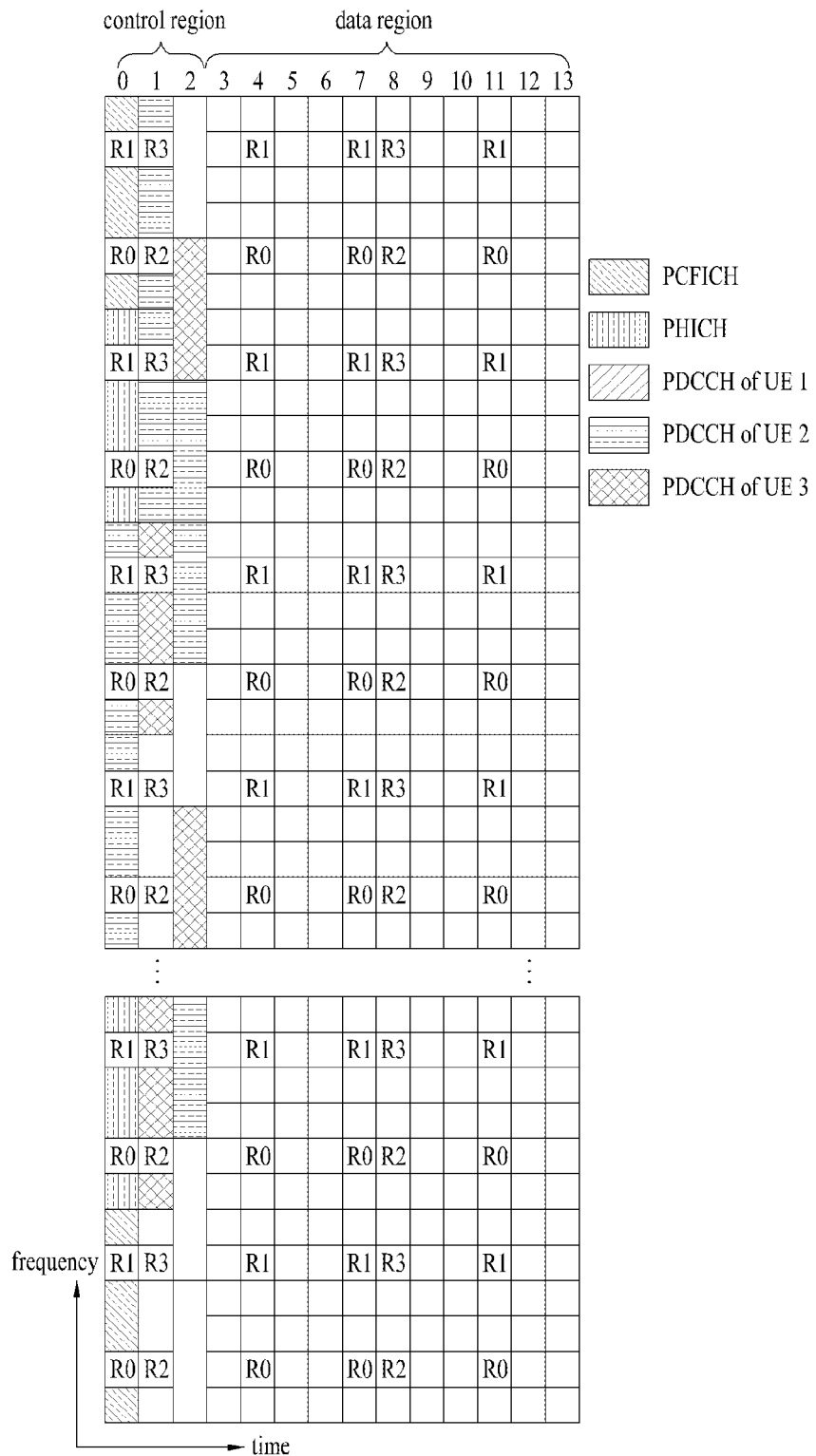
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS or a pilot signal) for an antenna 0 to 3. The RS is fixed as a constant pattern in the subframe irrespective of the control region and the data region. The control channel is allocated to a resource to which the RS is not allocated in the control region and a traffic channel is also allocated to a resource to which the RS is not allocated in the data region. The control channel allocated to the control region may include a physical control format indicator channel (PCFICH), a physical hybrid-ARQ indicator channel (PHICH), a physical downlink control channel (PDCCH) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on where the data of the PDSCH is transmitted to which user equipment (one or a plurality of user equipments) and the information on how to receive and decode the PDSCH data by the user equipments and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transmission block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
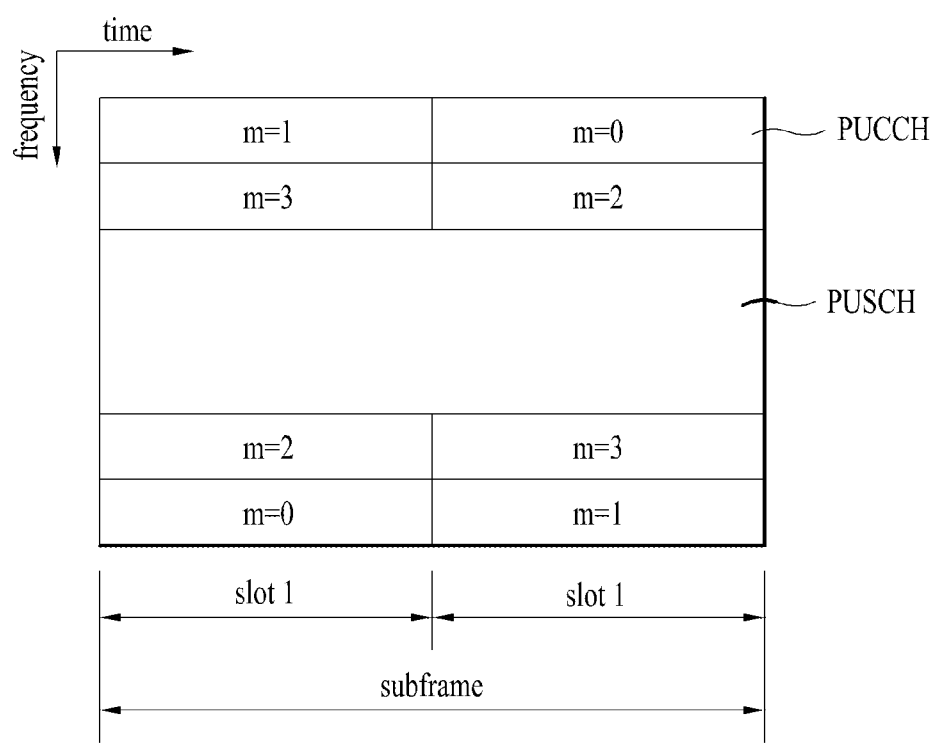
FIG. 6 is a diagram for a structure of an uplink subframe used in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource request, and the like. The PUCCH for a single UE uses one resource block, which occupies different frequencies in each slot within a subframe. In particular, 2 resource blocks assigned to the PUCCH are frequency hopped on a slot boundary. In particular, FIG. 6 shows an example that the PUCCH satisfying conditions (e.g., m=0, 1, 2, 3) is assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
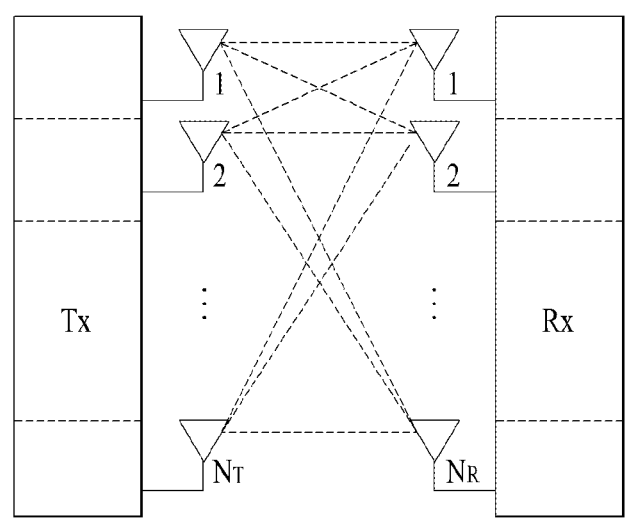
FIG. 7 is a block diagram of a general multi-antenna (MIMO) communication system.

A block diagram of a general multi-antenna communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, N_R) \quad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \quad \text{[Formula 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1, P_2, \ldots, P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vectors $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Formula 5]}$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \quad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \quad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

In the following, a reference signal is explained.

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both a transmitting end and the receiving end is transmitted and the channel information is found out with the extent of distortion when the signal is received on a channel. The signal known to both the receiving end and the transmitting end is called a pilot signal or a reference signal.

Recently, when a packet is transmitted, most of mobile communication systems intend to enhance transmission and reception efficiency by selecting multiple transmitting antennas and multiple receiving antennas instead of using a single transmitting antenna and a single receiving antenna. In case that a transmitting end or a receiving end intends to increase capacity or improve performance using multiple antennas, the transmitting end or the receiving end can receive a correct signal when a channel status between a transmitting antenna and a receiving antenna is known only. Hence, a separate reference signal should exist according to each transmitting antenna.

In a mobile communication system, a reference signal (RS) is mainly classified into two types in accordance with a purpose of the RS. One type of the RS is used to obtain channel information and another type of the RS is used to demodulate data. Since the former one is the RS to make a UE obtain DL channel information, it is transmitted in wideband. Although a UE does not receive DL data in a specific subframe, the UE should receive and measure the corresponding RS. This sort of RS can also be used for performing a measurement for a handover and the like.

In case that a base station transmits a resource in DL, the latter one corresponds to an RS transmitted together with the resource. A UE can perform channel estimation by receiving the RS and may be then able to demodulate data. This sort of RS should be transmitted to a region to which the data is transmitted.

LTE system defines two types of downlink RS for a unicast service. Specifically, one is a common RS (CRS) used for obtaining information on a channel status and performing measurement related to handover and the like and another is a dedicated RS (DRS) used for data demodulation. In this case, the CRS is also called a cell-specific RS and the DRS is also called a UE-specific.

In LTE system, the DRS is only used for the use of data demodulation and the CRS can be used for two purposes, i.e., obtaining channel information and performing data demodulation. The CRS is transmitted in every subframe over a wide band as a cell-specific reference signal. And, the CRS is transmitted based on maximum 4 antenna ports depending on the number of transmitting antenna of a base station. For instance, if the number of transmitting antenna of the base station corresponds to 2, the CRS for an antenna port 0 and the CRS for an antenna port 1 are transmitted. If the number of transmitting antenna of the base station corresponds to 4, the CRSs for an antenna port 0 to 3 are transmitted, respectively.

Figure 8:
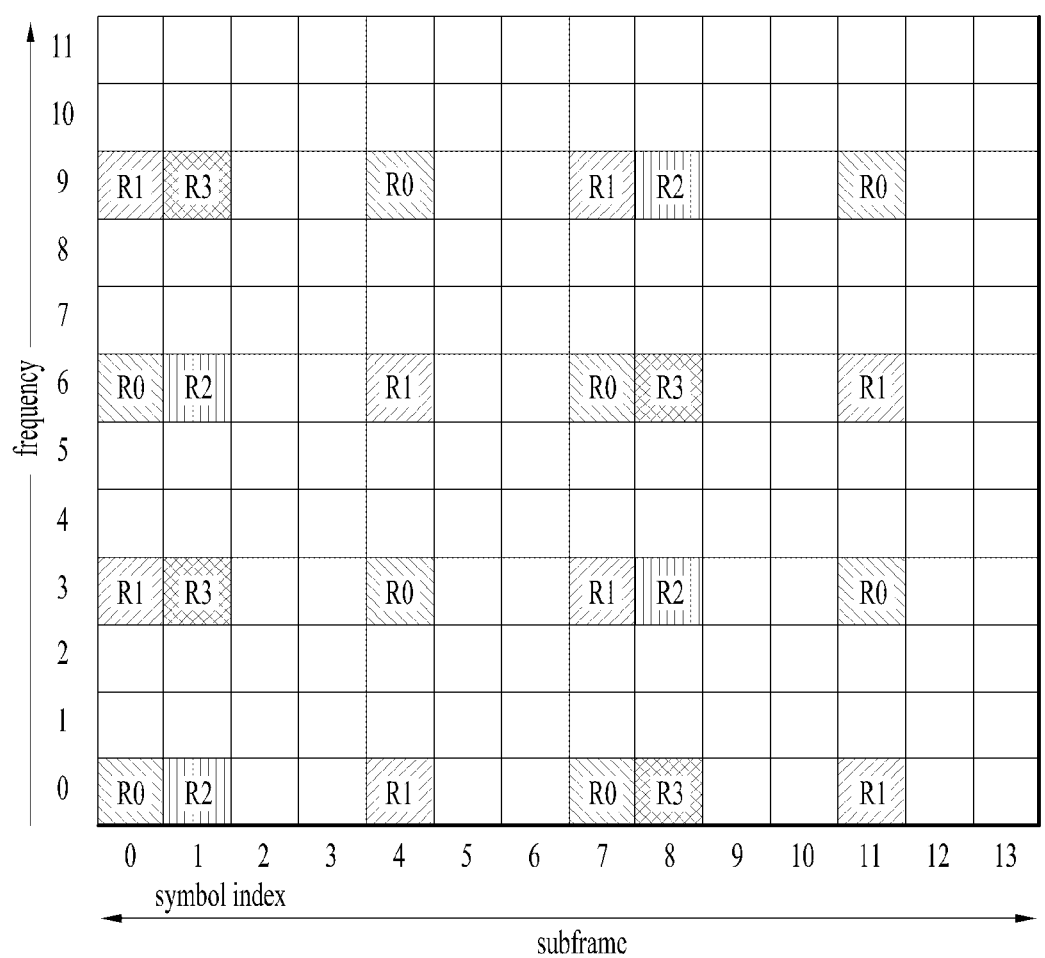
FIG. 8 is a diagram for an example of a general CRS pattern in case that there exist 4 transmission antennas in LTE system.

FIG. 8 is a diagram for an example of a general CRS pattern in case that there exist 4 transmission antennas in LTE system.

Referring to FIG. 8, if a CRS is mapped to a time-frequency resource in LTE system, a reference signal for one antenna port is transmitted in a manner of being mapped to one RE per 6 REs on a frequency axis. Since one RB includes 12 REs on the frequency, regarding RE for one antenna port, 2 REs are used per one RB.

Figure 9:
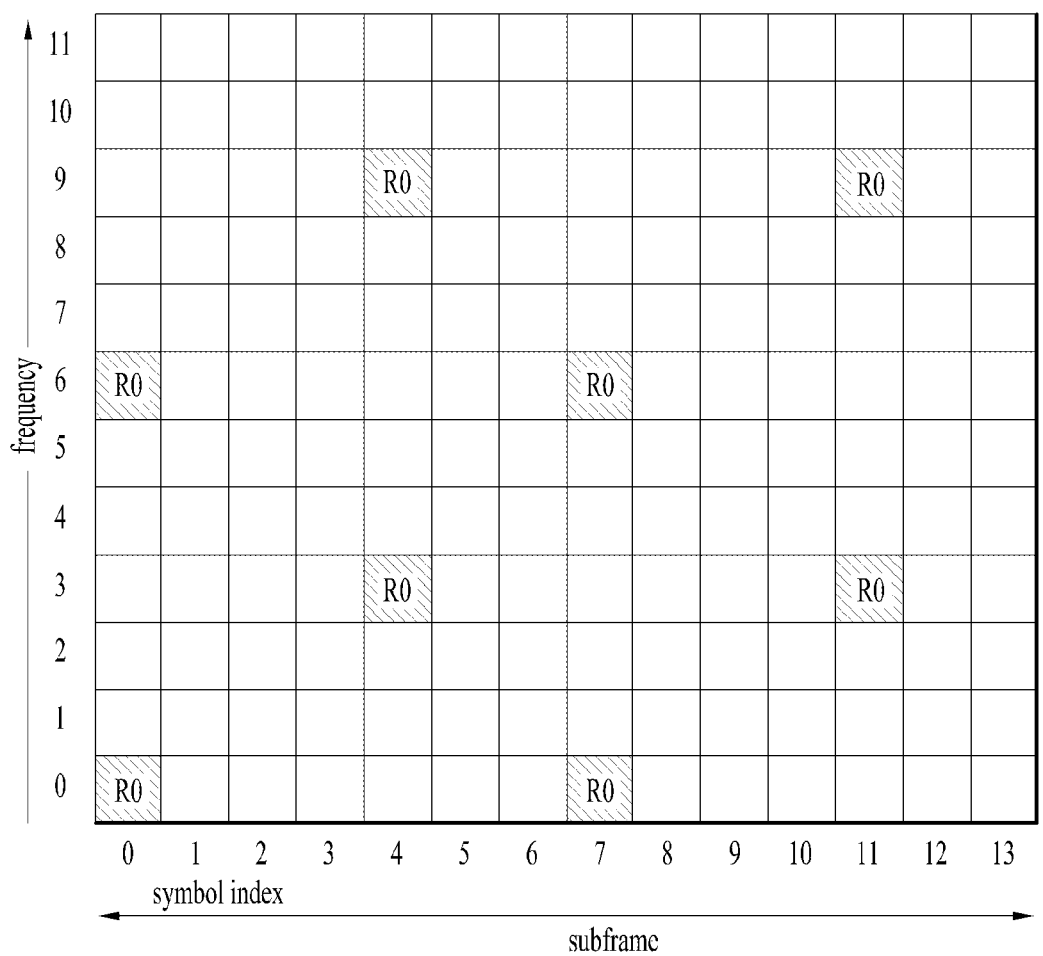
FIG. 9 is a diagram for an example of a CRS pattern for a transmission antenna port 0 in LTE system.

FIG. 9 is a diagram for an example of a CRS pattern for a transmission antenna port 0 in LTE system.

Meanwhile, in LTE-A system, which is an evolved version of LTE system, a base station should be designed to support maximum 8 transmitting antennas in DL. Hence, it is also necessary to support RS for the maximum 8 transmitting antennas.

Specifically, since a downlink RS is defined for maximum 4 antenna ports only in LTE system, if a base station includes more than 4 and maximum 8 DL transmitting antennas in LTE-A system, it is necessary to additionally define RS for the antenna ports. Regarding the RS for the maximum 8 transmitting antenna ports, it should consider both the RS used for channel measurement and the RS used for data demodulation.

One of the important considerations in designing LTE-A system is backward compatibility. The backward compatibility means to support a legacy LTE UE to properly operate in LTE-A system and the system should support the LTE UE as well. In terms of a transmission of an RS, RS for the maximum 8 transmitting antenna ports should be additionally defined in time-frequency domain where a CRC is transmitted. Yet, if a RS pattern for the maximum 8 transmitting antennas is added to whole band in every subframe in LTE-A system with a scheme such as the CRS of a legacy LTE system, RS overhead becomes considerably big.

Hence, a newly designed RS in LTE-A system can be mainly classified into two types. One is a channel state information RS (CSI-RS) used for a purpose of channel measurement to select a modulation and coding scheme (MCS), precoding matrix index (PMI) and the like. Another one is a demodulation RS (DM RS) used for a purpose of demodulating data transmitted via the maximum 8 transmitting antennas.

Unlike the CRS in the legacy LTE system used for the purpose of demodulating data as well as measuring for channel estimation, handover, and the like, the CSI-RS used for the purpose of channel measurement is mainly designed for the purpose of measuring for channel estimation. Unlike the CRS in the legacy LTE system, since the CSI-RS is transmitted to obtain information on a channel state only, it is not necessary to transmit the CSI-RS in every subframe. According to a current LTE-A standard, the CSI-RS can be assigned to an antenna port 15 to 22 and CSI-RS configuration information is received via an upper layer signaling.

And, for data demodulation, a DM RS as a dedicated reference signal is transmitted to a UE in which data transmission is scheduled in a corresponding time-frequency domain. In particular, the DM RS transmitted to a specific UE can be transmitted to a region in which the UE is scheduled, i.e., time-frequency domain to which data on the UE is transmitted only.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (CoMP-joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

In the following description, channel state information (CSI) report is explained. In a current LTE standard, there exist two types of transmission scheme, i.e., an open-loop MIMO operated without channel information and a closed-loop MIMO operated based on channel information. In particular, in the closed loop MIMO, each of a user equipment and an eNode B can perform a beamforming based on the channel state information to obtain a multiplexing gain of MIMO antenna. The eNode B transmits a reference signal to the user equipment to obtain channel state information from the user equipment and then commands the user equipment to feedback the channel state information measured based on the reference signal on Physical Uplink Control Channel (PUCCH) or Physical Uplink Shared Channel (PUSCH).

The CSI is mainly classified into an RI (rank indicator), a PMI (precoding matrix index), and a CQI (channel quality indication). First of all, as mentioned in the foregoing description, the RI indicates rank information of a channel and means the number of stream capable of being received by a user equipment via an identical frequency-time resource. And, since the RI is determined by a long term fading of a channel, the RI is feedback to an eNode B with a longer interval compared to the PMI and CQI value in general.

Secondly, the PMI is a value reflecting a spatial characteristic of a channel and indicates a UE's preferred precoding matrix index of an eNode B on the basis of such a metric as SINR, and the like. Lastly, the CQI is a value indicating strength of a channel and means a reception SINR capable of being received in case that an eNode B uses the PMI in general.

Obtaining an additional multi-user diversity using a multi-user MIMO (MU-MIMO) is added to a more advanced communication system such as LTE-A standard. Since interference between user equipments, which are multiplexed in an antenna domain, exists in MU-MIMO, accuracy of the CSI may deeply affect the interference of multiplexed different user equipment as well as the user equipment reporting the CSI. Hence, a more accurate CSI report is required in MU-MIMO compared to SU-MIMO.

To this end, LTE-A standard determined the last PMI to be designed in a manner of dividing into a W1 and a W2. The W1 indicates a long term and/or a wideband PMI and the W2 indicates a short term and/or a sub-band PMI.

As an example of a hierarchical codebook transformation scheme configuring one last PMI from the W1 and W2 information, a long-term covariance matrix of a channel can be used as shown in Formula 8 as follows.

$$W=\text{norm}(W1\,W2) \quad \text{[Formula 8]}$$

In the Formula 8, W2 corresponds to a codeword of a codebook configured to reflect short term channel information as a short term PMI, W corresponds to a codeword (in other word, a precoding matrix) of a last codebook, and norm(A) means a matrix that a norm of each row of matrix A is normalized to 1.

Detail structure of a legacy W1 and W2 is represented by Formula 9 as follows.

$$W1(i) = \begin{bmatrix} X_i & 0 \\ 0 & X_i \end{bmatrix}, \quad \text{[Formula 9]}$$

where $X_i$ is Nt/2 by M matrix.

$$W2(j) = \overbrace{\begin{bmatrix} e_M^k & e_M^l & & e_M^m \\ & & \cdots & \\ \alpha_j e_M^k & \beta_j e_M^l & & \gamma_j e_M^m \end{bmatrix}}^{r\ \text{columns}}$$

(if rank=r), where $1 \le k, l, m \le M$ and k, l, m are integer.

In this case, $N_t$ indicates the number of transmission antenna. And, M corresponds to the number of columns in a matrix $X_i$ and indicates that a total M number of candidate column vectors exist in the matrix $X_i$. $e_M^k$, $e_M^l$, and $e_M^m$ are column vectors where $k^{th}$, $l^{th}$ and $m^{th}$ element is 1 and the rest of elements is 0 among m number of elements and indicate $k^{th}$, $l^{th}$, and $m^{th}$ column vectors in the matrix $X_i$. $\alpha_j$, $\beta_j$, and $\gamma_j$ correspond to complex values having a unit norm, respectively. In case of sorting out $k^{th}$, $l^{th}$, and $m^{th}$ column vectors in the matrix $X_i$, $\alpha_j$, $\beta_j$, and $\gamma_j$ indicate that a phase rotation is applied to the $k^{th}$, $l^{th}$, and $m^{th}$ column vectors. 'i' is an integer equal to 0 or greater than 0 and indicates a PMI index indicating the W1. 'j' is an integer equal to 0 or greater than 0 and indicates the PMI index indicating the W2.

In Formula 9, a structure of a codeword uses a cross polarized antenna. In case that a space between antennas is dense, for instance, if a distance between neighboring antennas is less than a half of a signal wavelength in general, the structure is a structure designed in a manner of reflecting a correlation characteristic of a generated channel. In case of the cross polarized antenna, an antenna can be classified into a horizontal antenna group and a vertical antenna group. Each antenna group has a characteristic of a uniform linear array (ULA) and two antenna groups are co-located.

Hence, the correlation between antennas of each group has a characteristic of an identical linear phase increment and the correlation between the antenna groups has a characteristic of a phase rotation. Consequently, since a codebook is a value resulted from a channel quantization, it is necessary to design the codebook by reflecting the characteristic of a channel as it is. For clarity of explanation, a rank 1 codeword designed by the aforementioned structure can be represented as Formula 10 as follows.

$$W1(i) * W2(j) = \begin{bmatrix} X_i(k) \\ \alpha_j X_i(k) \end{bmatrix}$$ [Formula 10]

According to the above Formula 10, a codeword is represented by a vector of the number $N_T \times 1$ of transmission antennas, is structuralized by a upper vector $X_i(k)$ and a lower vector $\alpha_j X_i(k)$, and the upper and lower vector show the correlation characteristic of the horizontal antenna group and the vertical antenna group, respectively. It is better to represent the $X_i(k)$ as a vector having a characteristic of linear phase increment by reflecting the correlation characteristic between antennas of each group. As a representative example, a DFT matrix can be used.

In the following description, measurement of DL and reporting of the measured DL are explained.

In order for an eNode B to support a handover operation of a user equipment, inter-cell interference coordination and the like, it is necessary for the user equipment to perform DL measurement and report the measured DL to the eNode B. The DL measurement includes such various measurement schemes as measurement for RLM (radio link monitoring), measurement for a CSI (channel state information) report, measurement for RRM (radio resource management) and the like and various measurement values.

For instance, the RLM measurement may include DL measurement used in the process of detecting RLF (radio link failure) and searching for a new radio link. For instance, the measurement for a CSI report may include measurement used for reporting an appropriate rank indicator, a precoding matrix indicator and a channel quality indicator in a manner of selecting/calculating the rank indicator, the precoding matrix indicator and the channel quality indicator. For instance, the RRM measurement may include measurement used for determining whether to perform a handover by a user equipment.

The RRM measurement may include such measurement as RSRP (reference signal received power), RSRQ (reference signal received quality), RSSI (received signal strength indicator) and the like.

The RSRP is defined by a linear average of power of a resource element carrying a CRS (cell-specific reference signal) in a measured frequency bandwidth. A user equipment can determine the RSRP by detecting a cell-specific RS (CRS), which is transmitted in a manner of being mapped to a specific resource element. When the RSRP is calculated, a cell-specific reference signal (R0) for an antenna port 0 can be basically used. If a user equipment is able to reliably detect a cell-specific reference signal (R1) for an antenna port 1, the RSRP can be determined by, using the R1 in addition to the R0. Detailed content on the cell-specific reference signal may refer to the explanation explained with reference to FIG. 7 and a standard document (e.g., 3GPP TS36.211).

In order to get the RSRQ, the RSRP is multiplied by the number of resource blocks (N) within a measured frequency bandwidth and then a result of the multiplication is divided by 'E-UTRA carrier RSSI' (i.e., RSRQ=N×RSRP/)E-UTRA carrier RSSI)). The numerator (N×RSRP) and the denominator (E-UTRA carrier RSSI) are measured for an identical resource block set.

The 'E-UTRA carrier RSSI' includes a linear average of the total received power measured by a user equipment in OFDM symbols only including a reference symbol for an antenna port 0 (i.e., a CRS for an antenna port 0) in a measured bandwidth for a signal received from all sources including a common-channel serving cell, a non-serving cell, contiguous channel interference, a thermal noise and the like.

'UTRA FDD carrier RSSI' is defined by received wideband power including a noise generated in a receiver and thermal noise within a bandwidth defined by a receiver pulse forming filter.

'UTRA TDD carrier RSSI' is defined by received wideband power including a noise generated in a receiver and thermal noise within a bandwidth defined by a receiver pulse forming filter in a specific time slot.

Beside the above-mentioned items, explanation on DL channel measurement may refer to a standard document (e.g., 3GPP TS36.214). For clarity, detail explanation on the DL channel measurement is omitted at this time. Yet, it is apparent that the contents on the DL channel measurement disclosed in the standard document can be applied to DL channel measurement used in the following various embodiments of the present invention.

In the foregoing description, it is explained that MU-MIMO requires a more accurate CSI-report compared to SU-MIMO. Meanwhile, a more precise CSI report is also required for a CoMP transmission scheme compared to a general case. In case of a Joint-processing (CoMP-JP) scheme, since an eNode B cooperatively transmits an identical data to a specific user equipment, it can be considered as a MIMO system of which antennas are geographically distributed. Hence, in case of performing MU-MIMO in the Joint processing (CoMP-JP) scheme, an accurate CSI report is required to avoid interference between UEs where a cooperative scheduling is achieved. In the same manner, the accurate CSI report is also required in a cooperative scheduling/beamforming scheme. Hence, one embodiment of the present invention proposes to precisely measure interference of a neighboring cell in CoMP transmission scheme to perform a more accurate CSI report.

More specifically, the present invention proposes a method that a user equipment (UE) measures interference data to calculate CSI and then precisely corrects the measured interference data. As one embodiment of the present invention, there may exist a CoMP transmission scheme, by which the present invention may be non-limited. In the CoMP transmission environment, it is necessary for a UE to exclude interference coming from a part or all of CoMP cells participating in a CoMP operation and measure interference coming from remaining cells.

In the following description, a cell participating in a CoMP operation is used as a common name of a base station, a cell, an antenna port, an antenna port group, an RRH (remote radio head), a transmission point (TP), a reception point (RP), an access point (AP) and the like. And, such a terminology as a cell is mainly used in the following description. And, in order to clearly indicate an entity participating in a downlink CoMP operation for a specific UE, such a terminology as a TP may be used as well.

A UE firstly estimates an interference data via a specific resource (cell) designated by a base station. If an estimated value is different from an interference data, which is practically necessary for calculating the CSI, the interference data can be corrected by a method specified by the present invention. In order to explain what is proposes by the present invention, a general method proposed to measure an interference data is firstly explained in the following description.

Figure 10:
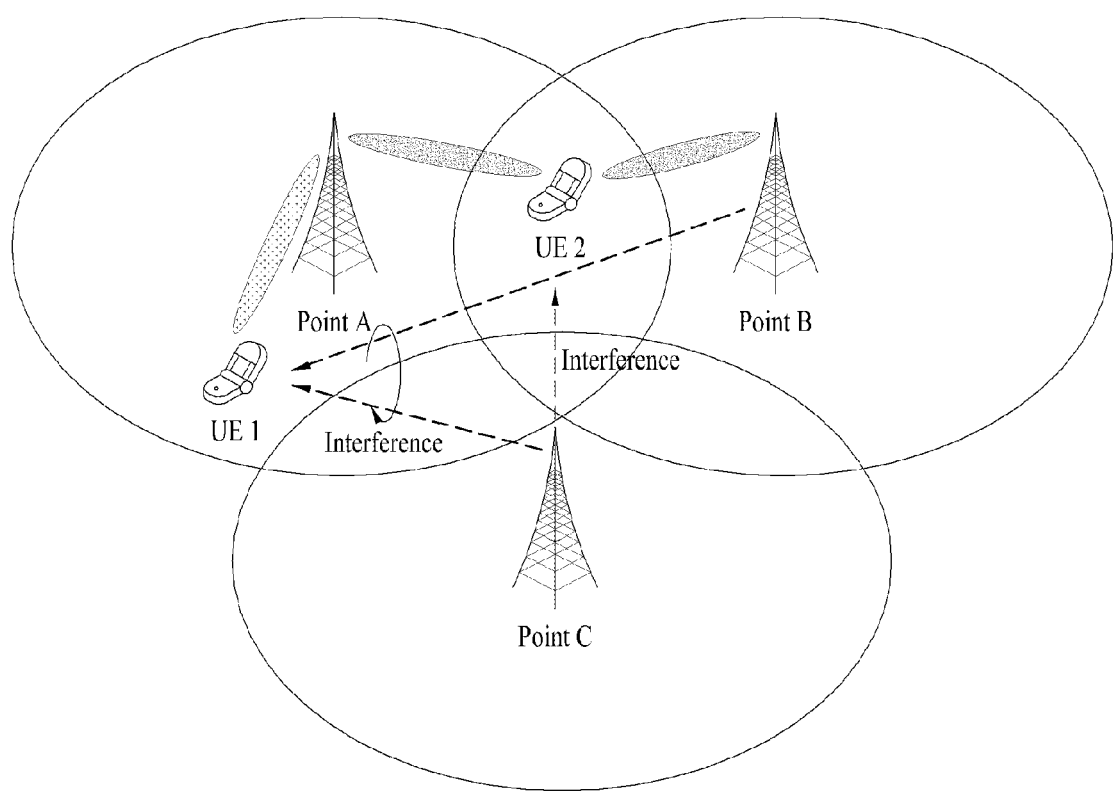
FIG. 10 is a diagram for one example of a method of measuring interference by a general method of the present invention.

FIG. 10 is a diagram for one example of a method of measuring interference by a general method of the present invention. According to a recently discussing trend, in CoMP situation, a base station designates a muting RE (resource element) in which transmit power of a part or all TPs is set to 0 to a UE and the UE estimates interference data from a signal received via the muting RE. In the following, a method of measuring the interference data via the muting RE is described with reference to FIG. 10 to FIG. 11.

Referring to FIG. 10, a TP A to a TP C affect a UE 1 and a UE 2 to which CoMP transmission schemes different from each other are applied, respectively. In this case, a CoMP transmission scheme may change according to a channel state of each UE or a network state. Assume that the UE 1 is transceiving data with the TP A only since the CoMP transmission scheme is not applied to the UE 1. Hence, the UE 1 intends to measure interference from the remaining TP B and the TP C except the TP A corresponding to the TP transceiving data with the UE 1. Assume that the UE 2 is transceiving data according to a joint processing transmission scheme where the TP A and the TP B are cooperating with each other. Hence, the UE 2 intends to measure interference from the remaining TP C except the TP A and the TP B corresponding to the TPs transceiving data with the UE 2.

In this circumstance, the TP A can provide the UE 1 with an interference measurement zone, which corresponds to one zone used for measuring an interference signal, among downlink resource region transmitted to the UE 1. The UE 1 can measure strength of the interference signal using data received via the interference measurement zone among the downlink resource region received from each of the TPs.

In an example of FIG. 10, the TP A can configure the interference measurement zone for the UE 1. A signal received from the TP A is muted and signals received from both the TP B and the TP C are not muted in the interference measurement zone. This is because the UE 1 intends to exclude the signal received from the TP A only to measure interference from the TP B and the TP C.

Similarly, the TP A or the TP B can configure a different interference measurement zone for the UE 2. A downlink signal received from the TP A and the TP B is muted and a downlink signal received from the TP C may not be muted in the interference measurement zone configured for the UE 2. This is because the UE 2 intends not to mute the signal received from the TP C to measure interference from the TP C. As mentioned in the foregoing description, interference can be measured by applying an appropriate muting configuration to each UE according to a CoMP transmission scheme of the each UE in a manner of configuring an independent interference measurement zone according to the each UE. The interference measurement zone which is configured according to the each UE is called a UE-specific interference measurement zone.

In case of assigning an interference measurement zone according to a UE, since an appropriate muting configuration can be provided to a CoMP transmission scheme of each UE, precise measurement can be performed in an interference environment. Hence, it will be unnecessary to perform a separate correction for a value of interference measured in the aforementioned environment.

Figure 11A:
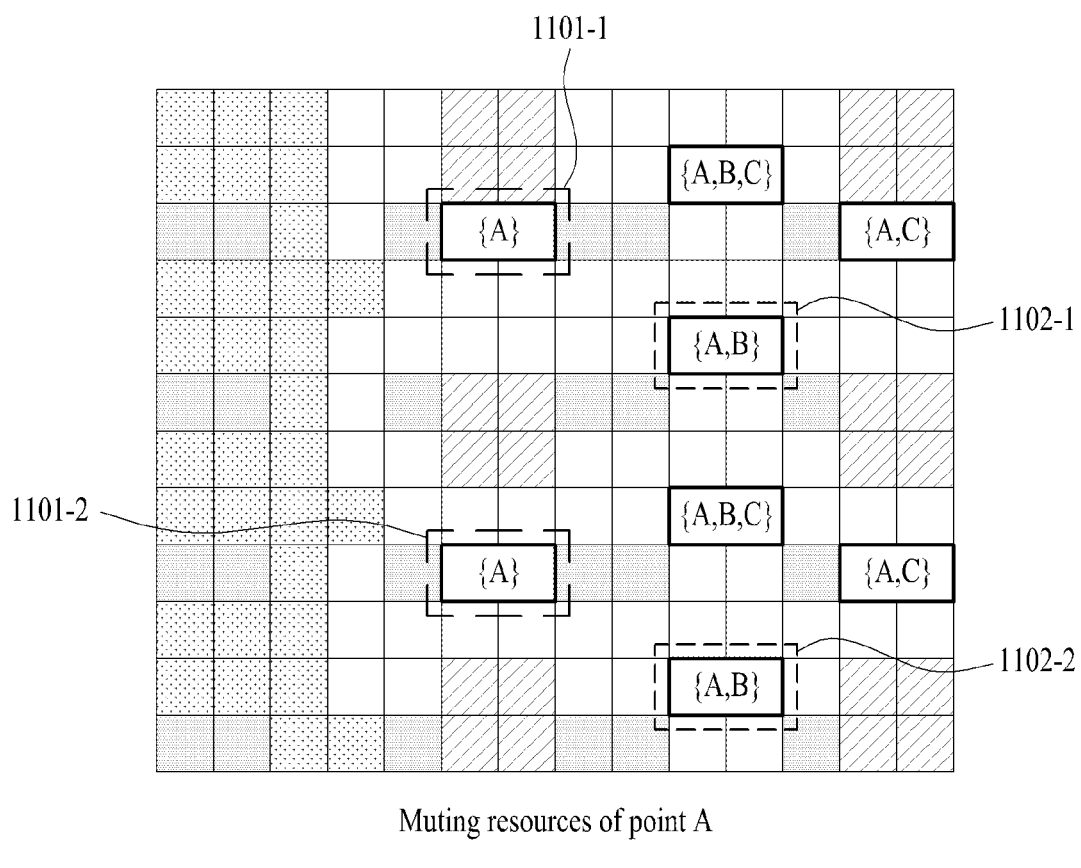
FIG. 11 is a diagram for one example of configuring a UE-specific interference measurement zone among resource region received from each TP.
Figure 11B:
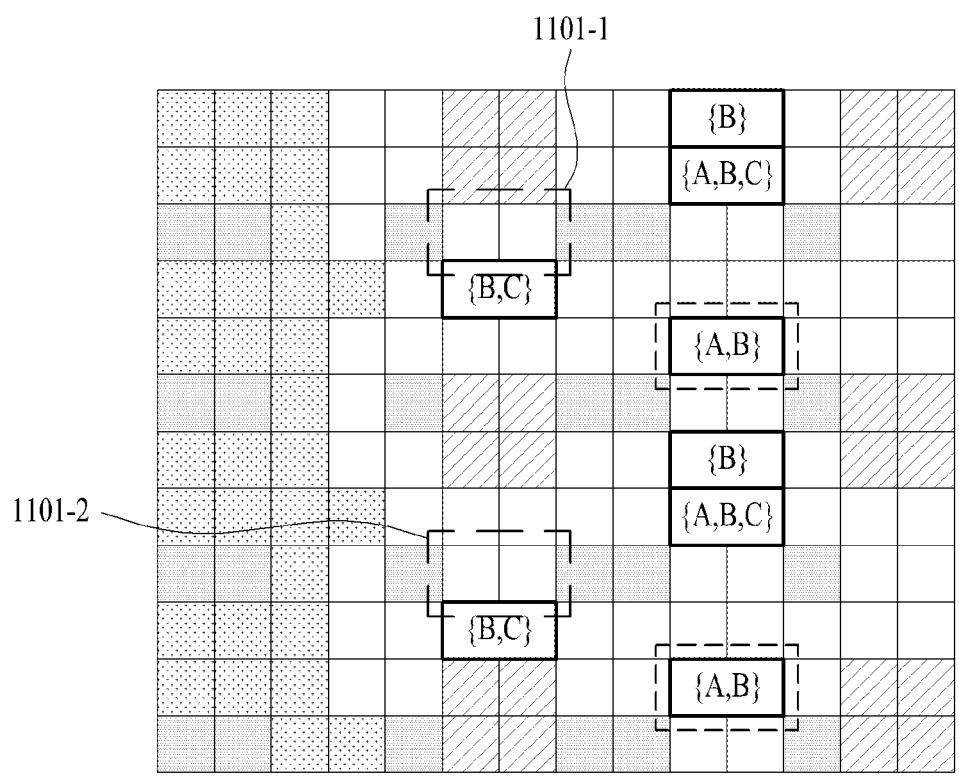

FIG. 11 is a diagram for one example of configuring a UE-specific interference measurement zone among resource region received from each TP. FIGS. 11a to 11c show downlink resource regions received from a TP A to a TP C, respectively. A muted TP is represented by a box in black color in each resource region. In the following description, when an example for a downlink resource region depicted in FIG. 11 is explained, if a muted signal is received via one region of the resource region, it may mean to transmit the signal in a manner of muting the signal by a TP transmitting the signal.

For instance, FIG. 11a shows a downlink resource region received from the TP A. Among the resource region, a muted signal is represented by a box in black color. And, a TP muted together with the signal is indicated in the inside of the black box. In particular, the muted signal is identically received from a position of the downlink resource region received from the TP which is indicated together with the muted signal.

For instance, a muted signal is received from the TP A in positions of two RE pairs 1101-1/1101-2 and "{A}" is indicated in the inside of the RE pairs. In this case, it indicates that the signal received from the TP A is muted only in the positions corresponding to the two RE pairs 1101-1/1101-2. In particular, signals, which are not muted, are received in positions corresponding to the two RE pairs 1101-1/1101-2 of a resource region received from the TP B and the TP C (refer to FIG. 11b and FIG. 11c).

Similarly, a muted signal is received in an RE pair indicated by "{A, B, C}" which is received from the TP A. And, a muted signal is also received in an RE pair of an identical position among a resource region received from the TP B and the TP C.

Hence, in a circumstance depicted in FIG. 10, since the UE 1 intends to measure interference from the TP B and the TP C only, the UE 1 measures interference in an environment in which the TP A is muted only. In particular, in case of measuring interference using data received from 1101-1 and 1101-2 among the resource regions depicted in FIG. 11a to FIG. 11c, the interference can be measured in the environment in which the signal from the TPA is muted.

Similarly, in the circumstance depicted in FIG. 10, since the UE 2 intends to measure interference from the TP C only, interference can be measured using data received in the 1101-1 and 1101-2 corresponding to a region in which data received from the TP A and the TP B are muted.

Meanwhile, as mentioned in the foregoing description, in case of following a scheme of separately configuring an interference measurement zone according to each UE, a base station can inform a UE of a position of a configured interference measurement zone via a control channel. In this case, if the number of TPs participating in CoMP increase, a position of the interference measurement zone should be configured according to the increased number of TPs. Hence, if the number of TPs increase, an overhead inevitably occurs in a signal used for muting and/or a control signal used for signaling the interference measurement zone. Hence, although configuration of the UE-specific interference measurement zone has a merit in that interference is measured in a more precise environment, an overhead may occur in a signal used for configuring muting.

As an alternative method for reducing the overhead according to the UE-specific interference measurement zone, it may use a method of configuring a cell-specific interference measurement zone. In this case, all UEs belonging to a specific cell measure interference via an identical RE. All TPs belonging to the specific cell transmit a muted signal via the RE. By doing so, since it is sufficient to mute only one CSI-RS, resource overhead can be minimized. If it is explained with reference drawings depicted in FIG. 11*a* to FIG. 11*c*, if a CSI-RS resource indicated by "{A, B, C}" is muted only, all signals received from the three TPs can be muted.

So far, the pros and cons of the UE-specific interference measurement zone and the cell-specific interference measurement zone are explained. FIG. 12 is a table summarizing the pros and cons for a scheme of the UE-specific interference measurement zone and a scheme of the cell-specific interference measurement zone. In particular, according to the scheme of the cell-specific interference measurement zone, since interference is measured without considering a detail situation of each UE, it may need a process of correcting a result of the interference measurement. One embodiment of the present invention intends to propose a method of precisely correcting the result of the interference measurement.

Figure 13:
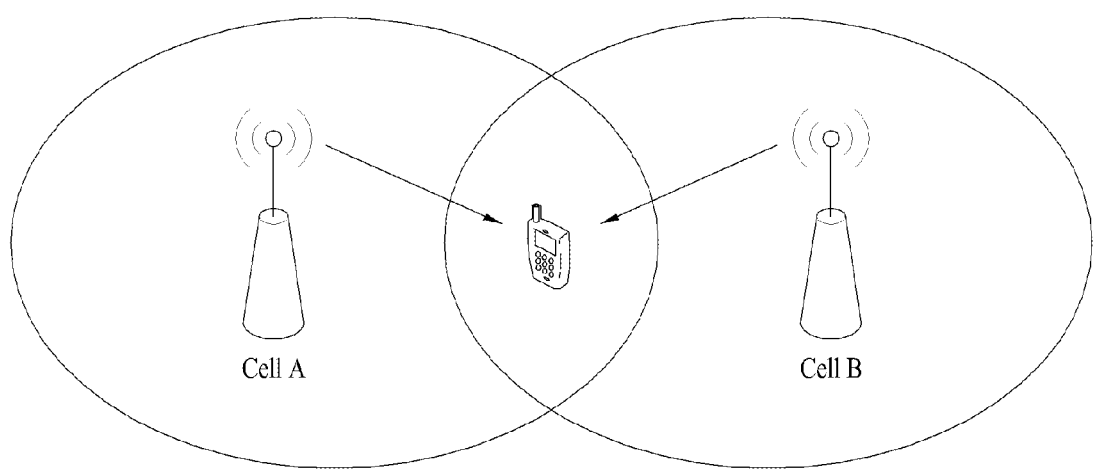
FIG. 13 is a diagram showing a coordinated communication performed by an A cell and a B cell for a CoMP UE.

FIG. 13 is a diagram showing a coordinated communication performed by an A cell and a B cell for a CoMP UE. In this case, the CoMP UE may have different interference data to be estimated according to a CoMP scheme.

For instance, in case of a DPS scheme, it is necessary to measure interference received from all cells except the A cell and interference received from all cells except the B cell, respectively. In case of measuring the interference received from all cells except the A cell, preferred interference can be measured via "{A}" region depicted in FIG. 11*a* to FIG. 11*c*. In case of measuring the interference received from all cells except the B cell, preferred interference can be measured via "{B}" region depicted in FIG. 11*a* to FIG. 11 *c*.

In case of a DPS muting scheme or a JT scheme, a UE should measure strength of an interference data signal received from all cells except the A and B cell and preferred interference can be measured via "{A, B} region depicted in FIG. 11*a* to FIG. 11*c*.

Referring to an example depicted in FIG. 13, since a geographical position of a UE corresponds to the middle of the A cell and the B cell, interference is measured using data received via "{A}", "{B}" or "{A, B}". Referring to a different example, if the geographical position of the UE corresponds to the middle of the A cell and the C cell, interference can be measured using data received via "{A}", "{C}" or "{A, C}".

As mentioned in the foregoing description, TPs to be considered may vary according to the geographical position of the UE. The TPs to be considered are called a CoMP measurement set in the following description. In particular, in an example of FIG. 13, the CoMP measurement set can be configured with the TP A and the TP B.

In the following, in order to explain one embodiment of the present invention, one or more base stations used for considering interference are represented as a base station group in the present specification and claims. It is apparent that one base station can belong to the base station group only.

A type of an interference signal varies according to each UE. In order to appropriately reflect the interference signal in accordance with a situation of each UE, the UE-specific interference measurement zone scheme can be utilized. Yet, as mentioned in the foregoing description, when the UE-specific interference measurement zone scheme is configured, overhead of a PDSCH resource may occur.

Hence, one embodiment of the present invention proposes a method of configuring a common interference muting set. And, if it is determined that there exists a difference between an interference data signal measured via the common interference muting set and an interference data signal necessary for calculating CoMP CSI, one embodiment of the present invention proposes a method of correcting the difference of the interference. According to one embodiment of the present invention, in case of measuring the interference data signal from the configured interference muting set, it may use a muting RE shown in FIG. 11*a* to FIG. 11*c*. For instance, if the TP A, the TP B and the TP C are configured as the interference muting set, interference strength can be measured by data received via an RE indicated by "{A, B, C}" among the downlink resource region depicted in FIG. 11*a* to FIG. 11*c*. Hence, a network signals to a UE for a position of the RE and the UE measures the interference strength in the position of the signaled RE. By doing so, the interference strength for the configured interference muting set can be measured.

In the following, a method of correcting a measured interference data according to one embodiment of the present invention is explained with reference to FIG. 14.

Figure 14:
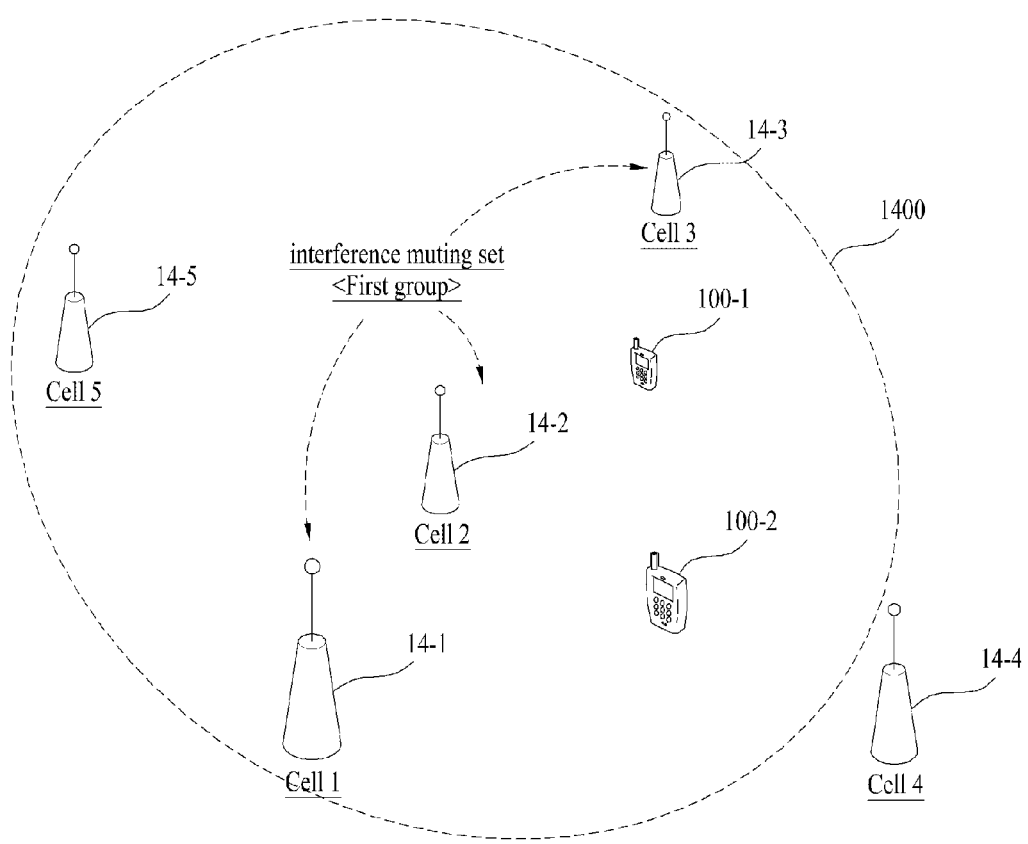
FIG. 14 is a diagram for an example of a specific situation to explain a method of correcting a measured interference data according to one embodiment of the present invention.

FIG. 14 is a diagram for an example of a specific situation to explain a method of correcting a measured interference data according to one embodiment of the present invention. FIG. 14 shows the total 5 cells including a cell 1 (14-1) to a cell 5 (14-5) and the total 2 UEs including a UE 1 (100-1) and a UE 2 (100-2).

UEs (100-1 and 100-2) included in a single cell 1400 have a common interference muting set. In FIG. 14, assume that a cell 1 (14-1), a cell 2 (14-2) and a cell 3 (14-3) are configured as the interference muting set. In particular, interference measured by the UEs (100-1 and 100-2) to which the interference muting set is commonly applied corresponds to interference received from cells (a cell 4 and a cell 5) except the interference muting set. This is because the UEs (100-1 and 100-2) receive a muted signal from all cells (the cell 1, 2 and 3) included in the interference muting set and a strength of interference measured by the muted signal considers interference from the remaining cells except the cells included in the interference muting set only.

In the following description, the remaining cells (a cell 4 and 5 in an example of FIG. 14) except the cells included in the interference muting set are grouped together and named a first eNode B group. And, strength of an interference signal received from the first eNode B group is named first interference strength.

Meanwhile, assume that a CoMP scheme of the UE 1 corresponds to a joint processing scheme of which the cell 2 (14-2) and the cell 3 (14-3) are participating in cooperation. In this case, it may be necessary for the UE 1 to measure interference received from all remaining cells except the cell 2 (14-2) and the cell 3 (14-3) transceiving data with the UE 1. In FIG. 14, the remaining cells except the cell 2 (14-2) and the cell 3 (14-3) correspond to the cell 1 (14-1), the cell 4 (14-4) and the cell 5 (14-5).

The UE 1 (100-1) may correct the measured first interference strength in a manner of adding interference strength received from the cell 1 (14-1) to the first interference strength. This is because, since the cell 4 (14-4) and the cell 5 (14-5) belong to the first eNode B group, the interference strength received from the cell 1 (14-1) is not reflected to the first interference strength. Hence, a target eNode B to correct the interference strength measured from the first eNode group is named a second eNode B group. And, strength of an interference signal received from the second eNode B group is named second interference strength. The second eNode B group for the UE 1 (100-1) includes the cell 1 (14-1) only and the second interference strength for the UE 1 (100-1) may correspond to interference strength received from the cell 1 (14-1) only. The first and the second interference strength for the UE 1 (100-1) and a measurement target cell are summarized in Table 1 in the following.

TABLE 1

| | Cell 1 | Cell 2 | Cell 3 | Cell 4 | Cell 5 | note |
|---|---|---|---|---|---|---|
| Interference measurement target cell of UE 1 | ○ | | | ○ | ○ | Cell 2 and 3 perform CoMP joint processing operation |
| Cell to which first interference strength is reflected (first eNode B group) | | | | ○ | ○ | |
| Correction target cell (second eNode B group) | ○ | | | | | Correction is performed by adding interference strength from second eNode B group |

Meanwhile, assume that a CoMP scheme of the UE 2 corresponds to a joint processing scheme of which the cell 1 (14-1) to the cell 4 (14-4) are participating in cooperation. In particular, the cell 5 (14-5) is the only one not participating in the CoMP joint processing. In this case, it may be necessary for the UE 2 to measure interference received from all remaining cells except the cell 1 (14-1) to the cell 4 (14-4) transceiving data with the UE 2. In FIG. 14, the remaining cells except the cell 1 (14-1) to the cell 4 (14-4) correspond to the cell 5 (14-5) only.

The UE 2 may correct the measured first interference strength in a manner of subtracting interference strength received from the cell 4 (14-4) from the first interference strength. This is because, since the cell 4 (14-4) belongs to the first eNode B group, the interference strength received from the cell 4 (14-4) is reflected to the first interference strength although the interference strength received from the cell 4 is not necessary. Since it is necessary to correct the first interference strength by subtracting the interference strength received from the cell 4 (14-4) from the first interference strength, in case of the UE 2, the second eNode B group may include the cell 4 (14-4) only. And, the interference strength received from the cell 4 (14-4) may correspond to the second interference strength. The first and the second interference strength for the UE 2 and a measurement target cell are summarized in Table 2 in the following.

TABLE 2

| | Cell 1 | Cell 2 | Cell 3 | Cell 4 | Cell 5 | note |
|---|---|---|---|---|---|---|
| Interference measurement target cell of UE 2 | | | | | ○ | Cell 1 to 4 perform CoMP joint processing operation |
| Cell to which first interference strength is reflected (first eNode B group) | | | ○ | ○ | | |
| Correction target cell (second eNode B group) | | | | ○ | | Correction is performed by subtracting interference strength received from second eNode B group |

As a prerequisite for enabling the aforementioned operation, it is necessary to independently estimate (or measure) an interference signal received from one or a plurality of cells (second eNode B group). One embodiment of the present invention proposes a method of independently measuring strength of an interference signal from a specific cell and a method of considering traffic of the specific cell in case of independently measuring the interference signal.

In measuring interference signal strength of a specific cell, traffic of the specific cell should be considered. This is because the interference signal strength varies according to the extent of the traffic. It is necessary to correct an interference signal according to the extent of traffic. Regarding this, it shall be described in detail with reference to FIG. 15 in the following.

Figure 15:
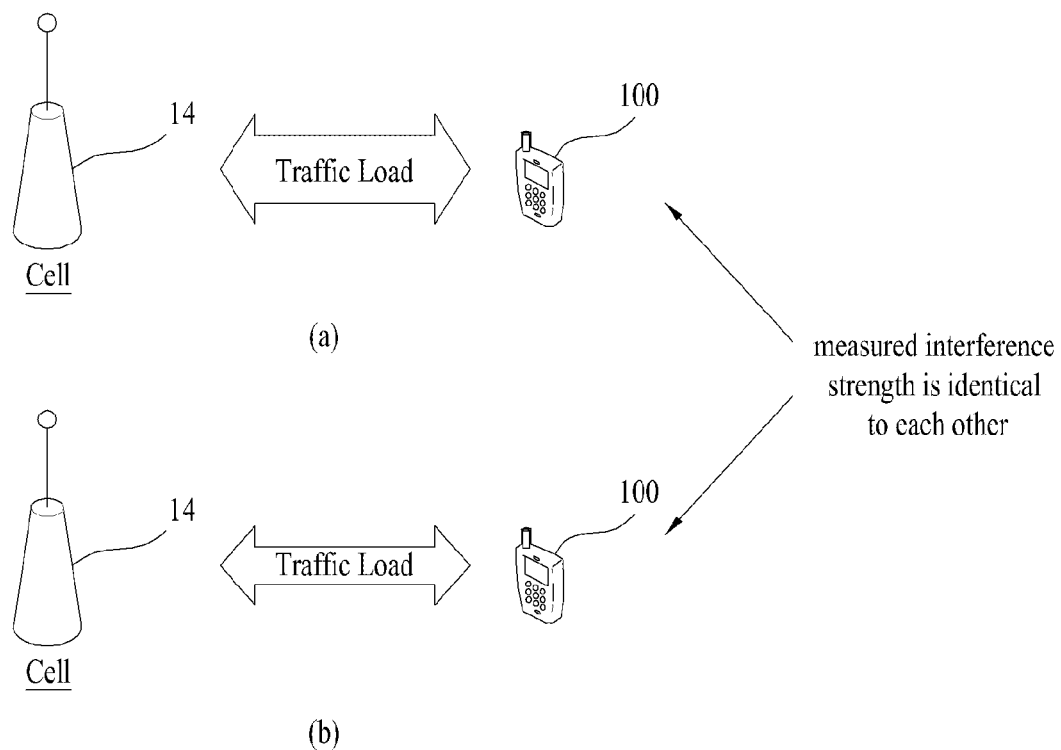
FIG. 15 is a diagram of an example for explaining necessity of interference signal correction according to one embodiment of the present invention.

FIG. 15 is a diagram of an example for explaining necessity of interference signal correction according to one embodiment of the present invention.

FIG. 15 (*a*) shows a state that there is a heavy traffic load between a cell 14 and a UE 100 and FIG. 15 (*b*) shows a state that there is a light traffic load between the cell 14 and the UE 100. According to FIG. 15, although the traffic load of the cell 14 is heading to the UE 100 only, it may be interpreted as an actual traffic load includes not only the traffic load heading to the UE 100 but also traffic load with different UEs transceiving data with the cell 14.

According to one embodiment of the present invention, strength of interference is calculated based on strength of an RS signal. In case of the heavy traffic load shown in FIG. 15 (*a*) and in case of the light traffic load shown in FIG. 15 (*b*), since RS signal strength itself does not change, the strength of interference may be identical to each other in both cases. This is because, although there is no PDSCH interference signal due to an actual traffic, the RS signal is transmitted. In particular, the strength of interference measured by the strength of the RS signal itself corresponds to strength of interference measured under an assumption that traffic load is always heavy.

Yet, since actual strength of interference is more interfered when the traffic load is heavy and the actual strength of interference is less interfered when the traffic load is light, the strength of interference should be calculated in a manner of reflecting the extent of the traffic load to the strength of interference.

As an example, as shown in FIG. 15 (b), if there is few traffic load from the cell 14, the cell 14 may not interfere with the UE. Yet, as mentioned in the foregoing description, the strength of interference measured by the strength of the RS signal corresponds to a result to which the extent of traffic load is not reflected. Hence, in this case, the extent of actual interference may have a value lower than a measured strength of interference.

Hence, one embodiment of the present invention further proposes to consider traffic load of a specific cell when strength of interference from the specific cell is calculated.

Meanwhile, a UE is unable to aware of the extent of traffic load of a specific cell. Hence, it is impossible for the UE to calculate the extent of interference by reflecting the extent of the traffic load of the specific cell. Hence, one embodiment of the present invention proposes to report a generally reported CQI (channel quality indicator) in two types and correct a CQI value (correct as CQI') in a manner of reflecting the extent of traffic based on the CQI of the two types. In case of reflecting the extent of traffic, an eNode B can perform interference correction based on the CQI of the two types and RSRQ (reference signal received quality) information indicating long-term channel power.

The CQI information of the two types according to one embodiment of the present invention can be defined by Formula 11 and Formula 12 in the following.

$$CQI_1 = \frac{P_s}{I_m} \qquad \text{[Formula 11]}$$

A CQI 1, which is first information, is identical to general CQI information. In Formula 11, $P_s$ indicates strength of a signal received from a serving cell. $I_m$ is explained later with reference to Formula 12.

$$CQI_2 = \frac{\sum_{i=1}^{n} P_i}{I_m} \qquad \text{[Formula 12]}$$

$I_m$ indicates power of interference measured by a UE via a muting RE or a zero-power CSI-RS. According to one embodiment of the present invention, the $I_m$ can be measured via an IMR (interference measurement resource).

The IMR is a resource region defined to measure interference. 1101-1 and 1101-2 explained with reference to FIG. 11A to FIG. 11C correspond, to examples of the IMR.

As mentioned in the foregoing description, if a cell-specific interference measurement zone is configured, the $I_m$ may not include interference received from a part of cells not belonging to a CoMP measurement set. Or, the $I_m$ may not include a part of interference among interference, which should be measured by the UE for CSI feedback. Hence, in order to include strength of the interference received from the part of the cells, a CQI 2, which is a second information, is calculated using a cell index i. The CQI 2 corresponds to CQI additionally transmitted together with the CQI 1 and may play a role of channel information supporting an eNode B to properly perform interference correction by reflecting a traffic status.

The Formula 12 for the CQI 2 corresponds to an example of the CQI 2 defined by one embodiment of the present invention. In Formula 12, i indicates a cell index. And, $P_i$ indicates strength of a signal (strength of interference) received from a cell of which the cell index corresponds to i. A UE can measure the $P_i$ via a CRS or a CSI-RS.

n indicates the number of cells of which interference affecting the UE is not reflected to $I_m$ among the cells not belonging to the CoMP measurement set.

The cell index i indicates indexes of the cells of which the interference affecting the UE is not reflected to the $I_m$ among the cells not belonging to the CoMP measurement set. In particular, the cell index i indicates the indexes of the cells becoming targets of correction of a measured $I_m$ value.

In Formula 12, the cell index i can be signaled to the UE by a serving cell. As mentioned in the foregoing description, strength of interference received from a second eNode B group is added or subtracted to correct a first interference strength value. The cell index i received from the serving cell may indicate a cell index belonging to the second eNode B group. In particular, the cell index i may correspond to information used by an eNode B to inform the UE of a cell becoming a target of correction.

According to one embodiment of the present invention, it is preferable that the cell index i dynamically varies. Hence, the cell index i can be signaled via a PDCCH region.

In one embodiment of the present invention, having received the cell index i from the eNode B, the UE calculates CQI 1 and CQI 2 based on the received cell index i and may be then able to feedback (report) the CQI 1 and 2 to the eNode B. In case that the UE reports the CQI 1 and 2 to the eNode B, the CQI 1 can be reported using a 4-bit CQI table generally used for reporting. In case that the UE reports the CQI 2 to the eNode B, the UE can feedback the CQI 2 to the eNode B using 3-bit information in a manner of quantizing a difference value different from the CQI 1.

The eNode B can calculate a corrected value CQI' based on the CQI 1 and 2 received from the UE. In this case, the corrected CQI' can reflect traffic load of cells becoming targets of correction. In the following, an specific example of reflecting the traffic load of the cells becoming the target of correction is explained with reference to Formula 13.

$$CQI' = \frac{CQI_1}{1 + (\alpha_1\beta_1 + \alpha_2\beta_2 + \alpha_3\beta_3 + , , , + \alpha_n\beta_n)CQI_2} \qquad \text{[Formula 13]}$$

In Formula 13, $a_i$ indicates a traffic load value of a cell having a cell index i and has a value between 0 and 1. If traffic is light, the $a_i$ has a value close to 0 and if traffic is heavy, the $a_i$ has a value close to 1. The $a_i$ is calculated by an eNode B and can be used for calculating the CQI' through sharing between eNode Bs. $B_j$ indicates a value of a ratio occupied by $P_j$ among $$\sum_{i=1}^{n} P_i.$$

The $B_j$ is estimated by an eNode B.

$$\sum_{i=1}^{n} \beta_i = 1$$

is satisfied. According to one embodiment of the present invention, estimation of the $B_j$ can be calculated by Formula 14 in the following.

$$\beta_j = \frac{RSRP_j}{\sum_{i}^{n} RSRP_i}. \quad \text{[Formula 14]}$$

In Formula 14, $RSRP_i$ indicates long-term channel power measured by the UE from a cell of a cell index i. The UE provides the $RSRP_i$ to an eNode B to make a handover. Since the eNode B does not know a ratio occupied by $P_j$ among $$\sum_{i=1}^{n} P_i,$$

which corresponds to the total of instantaneously changing interference strength obtained from short-term fading information, the eNode B uses RSRP corresponding to long-term fading information. Of course, although there may exist a difference between RSRP to which the long-term fading is reflected and the $P_i$ to which the short-term fading is reflected, since the cells of the cell index i correspond to cells positioned in the far distance in general, it is expected that the difference between the two values is not that big. Hence, it is anticipated that the estimation of the $B_j$ using Formula 14 according to one embodiment of the present invention may be matched with an actual value.

In the meantime, the aforementioned operation corresponds to interference measurement using a muting RE, by which the present invention may be non-limited. The interference can also be measured using a non-zero power CSI-RS for interference compensation.

Meanwhile, a UE operating in a CoMP situation receives CSI-RSs from each of a plurality of cells participating in a CoMP operation. The UE applies a CSI process to each of a plurality of the CSI-RSs and generates each CQI information via the applied CSI process. In this case, the UE assumes specific reception beamforming in each CSI process and calculates an attainable CQI value. One embodiment of the present invention proposes that an eNode B signals the UE in a manner of designating the specific reception beamforming by one of two options and the UE calculates a CQI value using the specific beamforming designated by the eNode B.

In the following, the two options capable of being designated by the eNode B for the UE are explained.

As a first option, the UE assumes a common reception beamforming and calculates CQI according to a plurality of CSI processes. This option is beneficial for calculating accurate CQI in case of such a scheme of receiving data from many cells as a CoMP joint processing. This is because, since a UE operating in a CoMP joint processing applies a single reception beamforming by receiving signals coming from a plurality of cells at the same time, CQI, which is calculated by a plurality of the CSI processes under an assumption of the common reception beamforming, may correspond to an accurate value. The eNode B may recalculate CQI suitable for the CoMP joint processing scheme in a manner of correcting each CQI received from the UE operating in the CoMP.

As a second option, the UE assumes reception beamforming different from each other, which are optimized for channels measured by a CSI-RS of each CSI process, and calculates each CQI. This option is effective when data is received from a single cell such as a CoMP DPS operation. This is because the UE operating in the DPS receives data from a single cell and it is reasonable for the UE to assume a reception beamforming optimized for a DL channel with the cell. By doing so, the UE can calculate an accurate CQI value in a corresponding CSI process.

One embodiment of the present invention proposes to signal a reception beamforming determination scheme of a CoMP UE by anticipating a CoMP scheme to be applied before the CoMP UE performs CSI feedback.

Hence, the aforementioned first option (in case of assuming the common reception beamforming) is explained first. In this case, an eNode B selects a specific CSI-RS optimized for a UE from received multiple CSI-RSs and signals the CoMP UE to make the UE determine reception beamforming optimized for the specific CSI-RS. Subsequently, the UE determines the optimized reception beamforming based on a channel measured by the specific CSI-RS and a CSI process for the signaled CSI-RS is configured as a reference CSI process. The UE applies the determined reception beamforming as it is to not only calculation of CQI in a CSI process corresponding to the selected CSI-RS but also calculation of CQI in a different CSI process following the reference CSI process.

In the second option (in case of assuming reception beamforming different from each other), in case that the UE calculates CQI for each CSI-RS, an eNode B signals control information to make the UE assume reception beamforming optimized for each CSI-RS.

The control information on the aforementioned two options can be semi-statically signaled to the UE by the eNode B via such upper layer information as RRC. And, the control information can also be dynamically signaled to the UE by the eNode B via a PDCCH control channel in a manner of being defined by a new field in DCI and the like.

Figure 16:
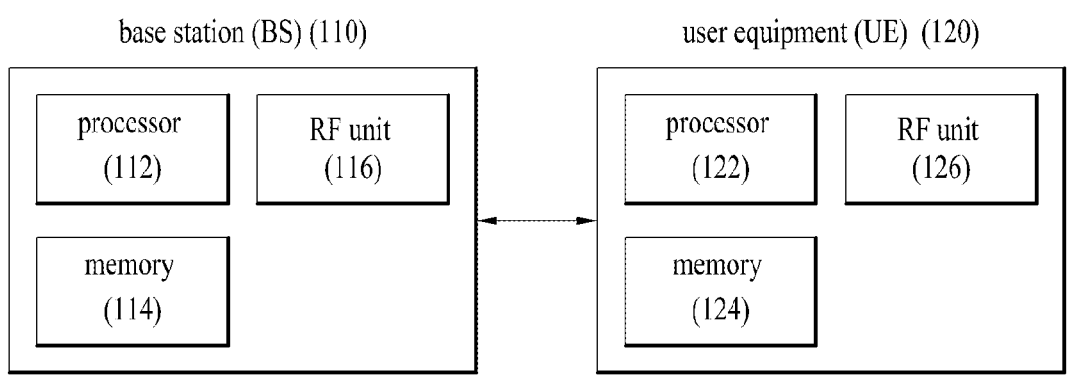
FIG. 16 is a diagram for a base station and a user equipment applicable to one embodiment of the present invention.

FIG. 16 is a diagram for a base station and a user equipment applicable to one embodiment of the present invention. If a relay is included in a wireless communication, a communication in backhaul link is performed between the base station and the relay and a communication in access link is performed between the relay and the user equipment. Hence, the base station or the user equipment shown in the drawing can be replaced by the relay in accordance with a situation.

Referring to FIG. 16, a wireless communication system includes a base station (BS) 110 and a user equipment (UE) 120. The base station 110 includes a processor 112, a memory 114 and a radio frequency (RF) module 116. The processor 112 can be configured to implement a procedure and/or methods proposed by the present invention. The memory 114 is connected with the processor 112 and stores various information related to operations of the processor 112. The RF unit 116 is connected with the processor 112 and transmits and/or receives a radio signal. The user equipment 120 includes a processor 122, a memory 124 and a radio frequency (RF) module 126. The processor 122 can be configured to implement a procedure and/or methods proposed by the present invention. The memory 124 is connected with the processor 122 and stores various information related to operations of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a UE can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of reporting channel state information in a wireless communication system and apparatus therefor are described with reference to examples applied to 3GPP LTE system, it may be applicable to various kinds of wireless communication systems as well as to the 3GPP LTE system.

FIG. 1
core network, access gateway
FIG. 2
control plane protocol stack
user plane protocol stack
FIG. 3
initial cell search S301
system information reception S302
random access procedures
general DL/UL Tx/Rx
UE CQI/PMI/rank report using PUSCH and PUCCH
FIG. 4
1 radio frame, 1 slot, 1 subframe
FIG. 5
control region, data region
frequency, time,
PDCCH of UE 1
PDCCH of UE 2
PDCCH of UE 3
FIG. 6
frequency, time
1 slot, 1 subframe
FIG. 8
RE index, frequency, symbol index, subframe
FIG. 9
RE index, frequency, symbol index, subframe
FIG. 12
Table comparing UE-specific interference measurement zone with cell-specific interference measurement zone

|  | UE-specific interference measurement zone | Cell-specific interference measurement zone |
|---|---|---|
| advantage | Not need to separately correct result<br>Applicable to various scenarios | Resource use for muting is not big<br>Similarly, applicable to various scenarios |
| disadvantage | Resource overhead may occur for muting | Need to separately correct result |

FIG. 14
First group
FIG. 15
measured interference strength is identical to each other
FIG. 16
base station (BS) 110, processor 112, memory 114, RF unit 116, user equipment (UE) 120, processor 122, memory 124, RF unit 126

What is claimed is:
1. A method of reporting a channel state by a user equipment to a serving eNode B in a wireless communication system, the method comprising:
receiving, by the user equipment, a first interference signal from a first eNode B group,
wherein a first channel state information is calculated based on first interference strength corresponding to the first interference signal;
receiving, by the user equipment, a second interference signal from a second eNode B group based on an identification information of an eNode B belonging to the second eNode B group, wherein second interference strength corresponds to the second interference signal, wherein a second channel state information is calculated based on a ratio between the first interference strength and the second interference strength; and transmitting, by the user equipment, the first channel state information and the second channel information to the serving eNode B, wherein the second channel state information is used for correcting the first channel state information, and wherein the serving eNode B estimates the channel state based on the corrected first channel state information.

2. The method of claim 1, wherein the first channel state information is corrected based on traffic load information on the eNode B belonging to the second eNode B group.

3. The method of claim 1, wherein the second channel state information, $CSI_2$, is determined as follows:

$$CSI_2 = \frac{\sum_{i=1}^{n} P_i}{I_m},$$

where corresponds to an identification index of the eNode B belonging to the second eNode B group, $P_i$ indicates strength of a signal received from a cell of which a cell index corresponds to i, the identification information of the eNode B contains the identification index of the eNode B, n indicates a number of eNode Bs belonging to the second eNode B group, and $I_m$ corresponds to the first interference strength.

4. The method of claim 1, wherein the first interference strength is measured on an IMR (interference measurement resource) defined for the first eNode B group.

5. A method of estimating a channel state by an eNode B based on a channel state information received from a user equipment in a wireless communication system, the method comprising:

receiving, by the eNode B, a first interference strength corresponding to an interference strength from a first eNode B group and a first channel state information indicating a channel strength ratio formed between the eNode B and the user equipment;

transmitting, by the eNode B, an identification information of an eNode B belonging to a second eNode B group to the user equipment;

receiving, by the eNode B, a second channel state information indicating a ratio between a second interference strength corresponding to an interference strength from the second eNode B group and the first interference strength; and correcting, by the eNode B, the first channel state information based on the second channel state information.

6. The method of claim 5, further comprising:

receiving a traffic load information of the eNode B belonging to the second eNode B group, wherein the first channel state information is corrected based on the traffic load information of the eNode B belonging to the second eNode B group.

7. The method of claim 6, wherein the first channel state information is corrected based on a first Formula $$CSI' = \frac{CSI_1}{1 + (\alpha_1\beta_1 + \alpha_2\beta_2 + \alpha_3\beta_3 + \ldots + \alpha_n\beta_n)CSI_2},$$

where CSI' corresponds to the corrected first channel state information, $CSI_1$ corresponds to the first channel state information, i corresponds to an identification index of the eNode B belonging to the second eNode B, identification information of the eNode B contains the identification index of the eNode B, $\alpha_i$ corresponds to a value indicating a traffic load of a eNode B corresponding to the eNode B of the identification index i (where $0 \leq \alpha_i \leq 1$), and $B_i$ corresponds to a ratio between an interference strength received from the eNode B corresponding to the eNode B of the identification index i and the second interference strength.

8. The method of claim 7, wherein $\beta_i$ is defined by a second Formula $$\beta_i = \frac{RSRP_i}{\sum_{j=1}^{n} RSRP_j},$$

wherein $RSRP_i$ is calculated based on a reception power of a reference signal received from the eNode B corresponding to the eNode B of the identification index i.

9. A user equipment for reporting a channel state to a serving eNode B in a wireless communication system, the user equipment comprising:

a reception module configured to receive a signal;

a transmission module configured to transmit a signal and a processor configured to control the reception module and the transmission module;

wherein the processor is further configured to:

receive, via the reception module, a first interference signal from a first eNode B group, wherein a first channel state information is calculated based on first interference strength corresponding to the first interference signal, receive, via the reception module, a second interference signal from a second eNode B group based on an identification information of an eNode B belonging to the second eNode B group, wherein second interference strength corresponds to the second interference signal, and wherein a second channel state information is calculated based on a ratio between the first interference strength and the second interference strength, and transmit, via the transmission module, the first channel state information and the second channel information to the serving eNode B, wherein the second channel state information is used for correcting the first channel state information, and wherein the serving eNode B estimates the channel state based on the corrected first channel state information.

10. The user equipment of claim 9, wherein the first channel state information is corrected based on traffic load information on the eNode B belonging to the second eNode B group.

11. The user equipment of claim 9, wherein the second channel state information, $CSI_2$, is determined as follows:

$$CSI_2 = \frac{\sum_{i=1}^{n} P_i}{I_m},$$

where i corresponds to an identification index of the eNode B belonging to the second eNode B group, $P_i$ indicates strength of a signal received from a cell of which a cell index corresponds to i, the identification information of the eNode B contains the identification index of the eNode B, n indicates a number of eNode Bs belonging to the second eNode B group, and $I_m$ corresponds to the first interference strength.

12. The user equipment of claim 9, wherein the processor is further configured to:
measure the first interference strength on an IMR (interference measurement resource) defined for the first eNode B group.

13. An eNode B for estimating a channel state based on a channel state information received from a user equipment in a wireless communication system, the eNode B comprising:
a reception module configured to receive an uplink signal from the user equipment;
a transmission module configured to transmit a downlink signal to the user equipment; and
a processor configured to control the reception module and the transmission module,
wherein the processor is further configured to:
receive, via the reception module, a first interference strength corresponding to an interference strength from a first eNode B group and a first channel state information indicating a channel strength ratio formed between the eNode B and the user equipment,
transmit, via the transmission module, an identification information of an eNode B belonging to a second eNode B group to the user equipment,
receive, via the reception module, a second channel state information indicating a ratio between a second interference strength corresponding to an interference strength from the second eNode B group and the first interference strength, and
correct the first channel state information based on the second channel state information.

14. The eNode B of claim 13, wherein the processor is further configured to:
receive, via the reception module, a traffic load information of the eNode B belonging to the second eNode B group via the reception module, and
correct the first channel state information based on the traffic load information of the eNode B belonging to the second eNode B group.

15. The eNode B of claim 14, wherein the processor is further configured to:
correct the first channel state information based on a first Formula $$CSI' = \frac{CSI_1}{1 + (\alpha_1\beta_1 + \alpha_2\beta_2 + \alpha_3\beta_3 + , , , +\alpha_n\beta_n)CSI_2},$$

where CSI' corresponds to the corrected first channel state information, $CSI_1$ corresponds to the first channel state information, i corresponds to an identification index of the eNode B belonging to the second eNode B, identification information of the eNode B contains the identification index of the eNode B, $\alpha_i$ corresponds to a value indicating a traffic load of a eNode B corresponding to the eNode B of the identification index i (where $0 \leq \alpha_i \leq 1$), and $B_i$ corresponds to a ratio between an interference strength received from the eNode B corresponding to the eNode B of the identification index i and the second interference strength.

16. The eNode B of claim 15, wherein $\beta_i$ is defined by a second Formula $$\beta_i = \frac{RSRP_i}{\sum_{j=1}^{n} RSRP_j},$$

wherein $RSRP_i$ is calculated based on a reception power of a reference signal received from the eNode B corresponding to the eNode B of the identification index i.

* * * * *